United States Patent
Lei et al.

(10) Patent No.: US 11,456,813 B2
(45) Date of Patent: Sep. 27, 2022

(54) PAPR AND INTER-CELL INTERFERENCE REDUCTION

(71) Applicant: QUALCOMM Incorporated, San Diego, CA (US)

(72) Inventors: Jing Lei, San Diego, CA (US); Renqiu Wang, San Diego, CA (US); Tingfang Ji, San Diego, CA (US); Joseph Binamira Soriaga, San Diego, CA (US); Yiqing Cao, Beijing (CN); Seyong Park, San Diego, CA (US); Naga Bhushan, San Diego, CA (US); Wanshi Chen, San Diego, CA (US); Peter Gaal, San Diego, CA (US); Jay Kumar Sundararajan, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/733,435

(22) PCT Filed: Feb. 13, 2019

(86) PCT No.: PCT/CN2019/074949
§ 371 (c)(1),
(2) Date: Jul. 29, 2020

(87) PCT Pub. No.: WO2019/158081
PCT Pub. Date: Aug. 22, 2019

(65) Prior Publication Data
US 2021/0105079 A1   Apr. 8, 2021

Related U.S. Application Data

(60) Provisional application No. 62/710,477, filed on Feb. 16, 2018.

(30) Foreign Application Priority Data

Feb. 13, 2018 (WO) ................. PCT/CN2018/076613
Feb. 14, 2018 (WO) ................. PCT/CN2018/076815

(51) Int. Cl.
*H04J 11/00* (2006.01)
*H04L 27/26* (2006.01)
*H04L 25/03* (2006.01)

(52) U.S. Cl.
CPC ...... *H04J 11/005* (2013.01); *H04L 25/03866* (2013.01); *H04L 27/2602* (2013.01); *H04L 27/2615* (2013.01); *H04L 27/2636* (2013.01)

(58) Field of Classification Search
CPC .............. H04J 11/005; H04L 25/03866; H04L 27/2602; H04L 27/2615; H04L 27/6336
(Continued)

(56) References Cited

U.S. PATENT DOCUMENTS 8,014,265 B2   9/2011   Sarkar et al.
2004/0176113 A1   9/2004   Chen et al.
(Continued)

FOREIGN PATENT DOCUMENTS

CN   1254996 A   5/2000
CN   101919171 A   12/2010
(Continued)

OTHER PUBLICATIONS

International Search Report and Written Opinion—PCT/CN2019/074949—ISA/CN—dated May 6, 2019.
(Continued)

*Primary Examiner* — Candal Elpenord
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment
(Continued)

may apply one or more spreading sequences to a set of modulation symbols of a data set to generate spread modulation symbols; apply a scrambling sequence to the spread modulation symbols to generate a set of scrambled symbols; and transmit a waveform based at least in part on the set of scrambled symbols. Numerous other aspects are provided.

55 Claims, 23 Drawing Sheets

(58) Field of Classification Search
USPC .......................................................... 370/335
See application file for complete search history.

(56) References Cited

U.S. PATENT DOCUMENTS

| | | | |
|---|---|---|---|
| 2009/0316633 | A1 | 12/2009 | Kato et al. |
| 2012/0163159 | A1* | 6/2012 | Luo ...................... H04L 1/1692 370/210 |
| 2013/0279485 | A1 | 10/2013 | Gao et al. |
| 2016/0352478 | A1* | 12/2016 | Jia ....................... H04L 27/2634 |
| 2017/0171865 | A1 | 6/2017 | Hwang et al. |
| 2018/0279361 | A1* | 9/2018 | Yoo ..................... H04W 74/006 |
| 2019/0222371 | A1* | 7/2019 | Sahin .................. H04L 27/3416 |
| 2019/0245640 | A1* | 8/2019 | Yoshimoto ............ H04L 5/0053 |
| 2020/0351883 | A1* | 11/2020 | Wu .................. H04W 72/0466 |
| 2020/0396698 | A1* | 12/2020 | Bala ...................... H04L 5/0005 |
| 2021/0143948 | A1* | 5/2021 | Choi ..................... H04L 5/0012 |

FOREIGN PATENT DOCUMENTS

| | | |
|---|---|---|
| CN | 102227888 A | 10/2011 |
| CN | 103840909 A | 6/2014 |
| CN | 107370702 A | 11/2017 |
| EP | 1158689 A1 | 11/2001 |
| EP | 2525515 A2 | 11/2012 |
| WO | 09023860 | 2/2009 |
| WO | 2017139005 A1 | 8/2017 |
| WO | 2017196703 A1 | 11/2017 |

OTHER PUBLICATIONS

International Search Report and Written Opinion—PCT/CN2018/076613—ISA/CN—dated Nov. 5, 2018.
International Search Report and Written Opinion—PCT/CN2018/076815—ISA/CN—dated Nov. 6, 2018.
ETRI: "Details of DFT-S-OFDM Based A/N Transmission", 3GPP Draft, 3GPP TSG RAN WG1 Meeting #62, R1-104665, DFT_S_OFDM AN, 3rd Generation Partnership Project (3GPP), Mobile Competence Centre, 650, Route Des Lucioles, F-06921 Sophia-Antipolis Cedex, France, vol. RAN WG1, No. Madrid, Spain, Aug. 23, 2010, Aug. 17, 2010 (Aug. 17, 2010), XP050449942, 3 Pages, [Retrieved on Aug. 17, 2010] Sections 2 and 3 figure 2.
Panasonic: "Signaling Parameters for UL ACK/NACK Resources", 3GPP Draft, 3GPP TSG RAN WG1 Meeting #50, R1-073616, 3rd Generation Partnership Project (3GPP), Mobile Competence Centre, 650, Route Des Lucioles, F-06921 Sophia-Antipolis Cedex, France, vol. RAN WG1, No. Athens, Greece, Aug. 15, 2007, Aug. 15, 2007 (Aug. 15, 2007), XP050107214, 3 Pages, [Retrieved on Aug. 15, 2007] Section 2 figure 1.
Supplementary European Search Report—EP19754430—Search Authority—Munich—dated Oct. 14, 2021.

* cited by examiner

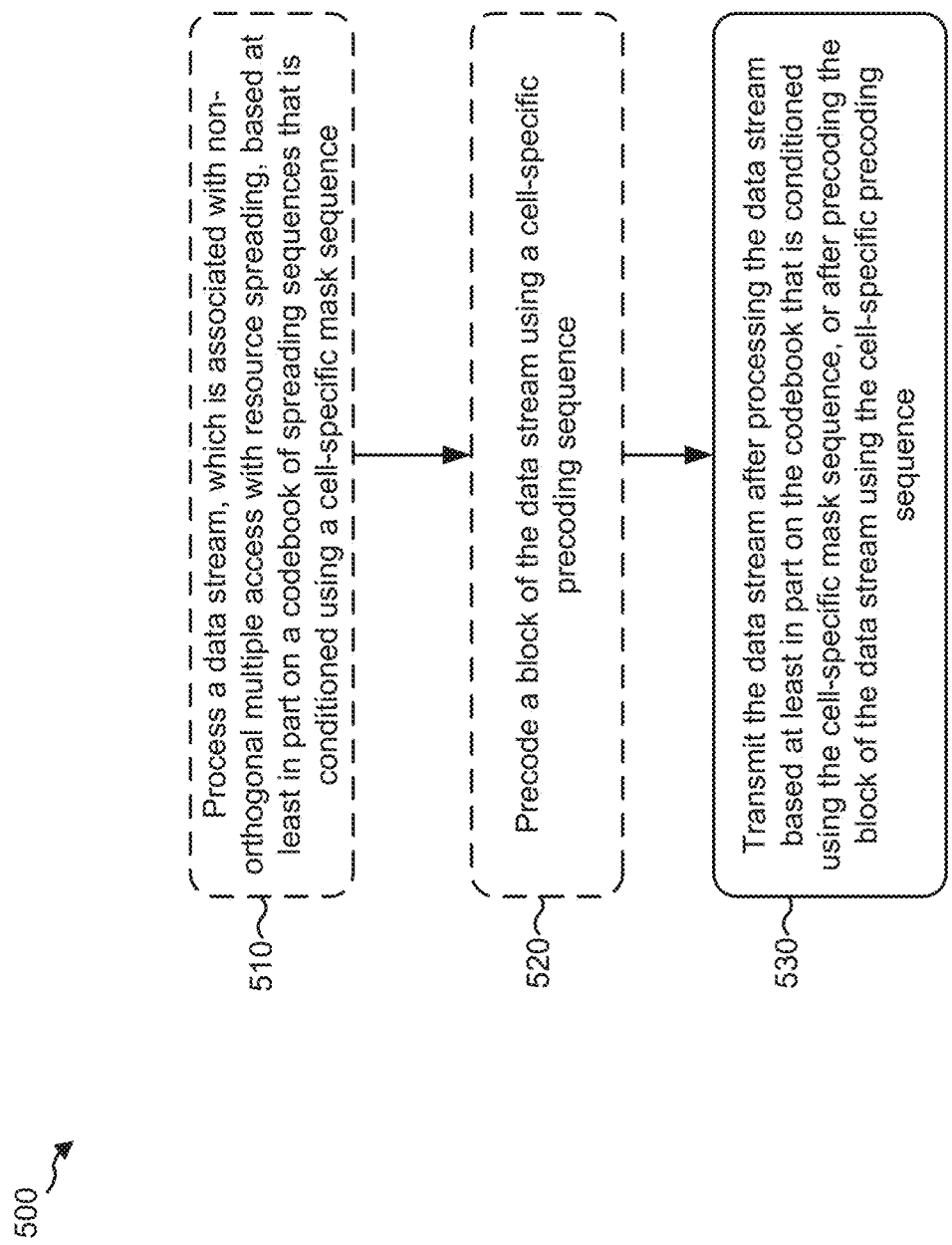

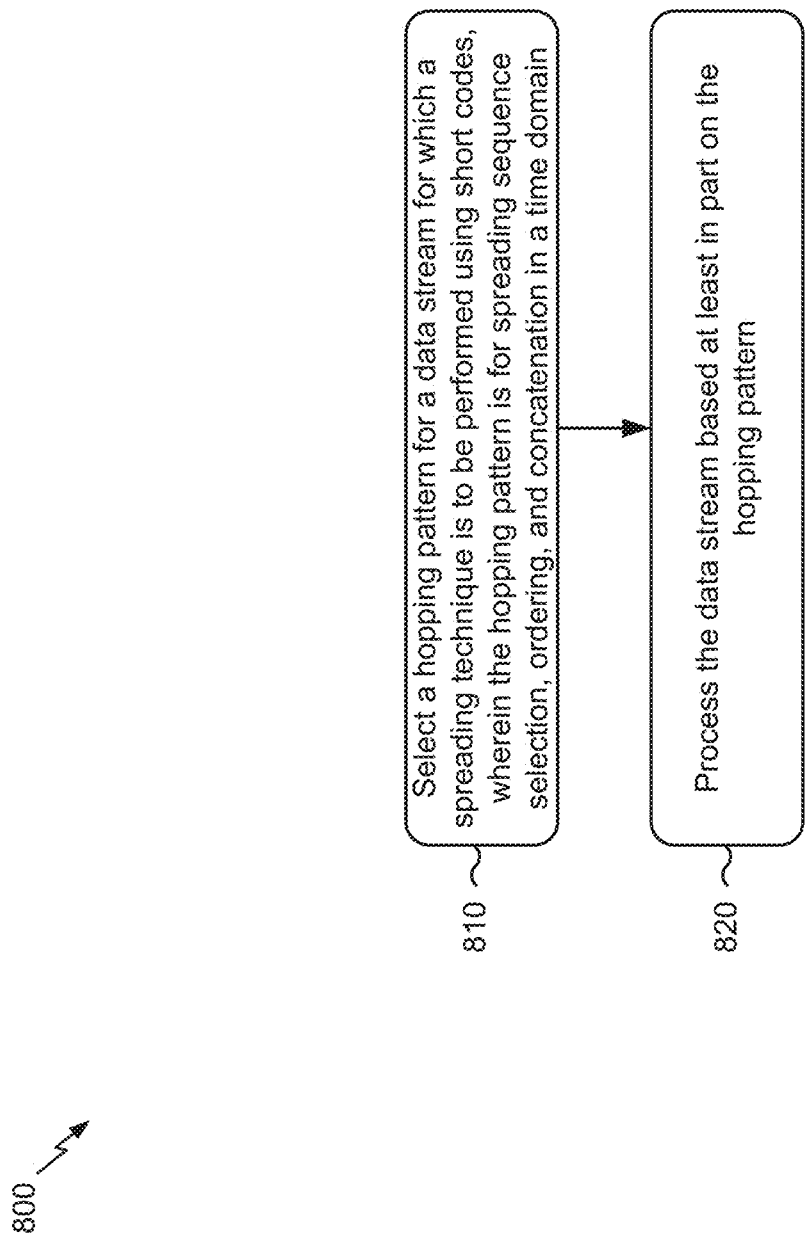

PAPR AND INTER-CELL INTERFERENCE REDUCTION

CROSS-REFERENCE TO RELATED APPLICATIONS

This application is a 371 national stage of PCT Application No. PCT/CN2019/074949 filed on Feb. 13, 2019, entitled "PAPR AND INTER-CELL INTERFERENCE REDUCTION," which claims priority to Chinese Patent Cooperation Treaty Application No. PCT/CN2018/076613, filed on Feb. 13, 2018, entitled "TECHNIQUES AND APPARATUSES FOR PAPR AND INTER-CELL INTERFERENCE REDUCTION FOR NON-ORTHOGONAL MULTIPLE ACCESS," Chinese Patent Cooperation Treaty Application No. PCT/CN2018/076815, filed on Feb. 14, 2018, entitled "TECHNIQUES AND APPARATUSES FOR TIME-DOMAIN SPREADING IN NON-ORTHOGONAL MULTIPLE ACCESS," and U.S. Provisional Patent Application No. 62/710,477, filed on Feb. 16, 2018, entitled "PEAK-TO-AVERAGE POWER RATIO REDUCTION AND INTER-CELL INTERFERENCE MANAGEMENT," all of which are hereby expressly incorporated by reference herein.

FIELD OF THE DISCLOSURE

Aspects of the present disclosure generally relate to wireless communication, and more particularly to techniques and apparatuses for peak-to-average power ratio (PAPR) and inter-cell interference reduction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

Some techniques and apparatuses described herein provide the reduction of PAPR of a CP-OFDM waveform when linear spreading or a cover code (e.g., an orthogonal cover code) is applied in the frequency domain. In this case, a joint design of spreading codes and scrambling codes may be applied at the modulation symbol level, as described herein. Furthermore, in some cases, the spreading codes may be applied using a hopping pattern. Some techniques and apparatuses described herein provide the reduction of PAPR of a DFT-s-OFDM waveform when linear spreading or a cover code is applied in the time domain. In this case, a joint design of spreading codes and scrambling codes may be applied at the modulation symbol level, as described herein. Furthermore, in some cases, the spreading codes may be applied using a hopping pattern. Some techniques and apparatuses described herein provide reduced inter-cell interference for uplink transmissions (e.g., grant free transmissions or grant based transmissions) when multiple cells share the same codebook for linear spreading or orthogonal cover coding. For example, some techniques and apparatuses described herein may use cell-specific modulation symbol-level scrambling. As another example, some techniques and apparatuses described herein may use subset partitioning of a linear spreading codebook. As yet another example, some techniques and apparatuses described herein may use cell-specific hopping of spreading codes. In general, these techniques and apparatuses can be applied for multi-user (MU) multiple-input multiple-output (MIMO) (e.g., for a demodulation reference signal (DMRS), a physical uplink shared channel (PUSCH), a physical uplink control channel (PUCCH), and/or the like), a positioning reference signal (PRS), a sounding reference signal (SRS), or another type of uplink or downlink wireless communication. These techniques and apparatuses described herein are applicable for NOMA as well as OMA.

Some of the described techniques relate to improved methods, systems, devices, or apparatuses that support peak-to-average power ratio (PAPR) reduction and inter-cell interference management. Generally, the described techniques provide for a user equipment (UE) to communicate with a base station using a non-orthogonal multiple access (NOMA) uplink transmission with a discrete Fourier transform-spread-orthogonal frequency division multiplexing (DFT-s-OFDM) waveform. The UE may perform a NOMA DFT-s-OFDM waveform generation process including cell-specific or symbol-specific time domain spreading. For example, the UE may identify a data symbol vector for uplink transmission, and may perform UE-specific spreading or scrambling of the data symbol vector. The UE may convert this spread vector into sets of time domain symbols, and may apply a scrambling vector to the time domain symbols to reduce PAPR and inter-cell interference. In some cases, the UE-specific spreading or scrambling may induce PAPR degradation (e.g., higher PAPR), which may be mitigated by the cell-specific or symbol-specific scrambling. The UE may perform the scrambling in the time domain using a scrambling vector generated based on a cell identifier, a symbol index, a scrambling vector length, or some combination of these parameters. The UE may then perform transforms (e.g., a DFT, an inverse fast Fourier transform (IFFT), or both) on the spread sets of time domain symbols to generate a NOMA DFT-s-OFDM waveform for uplink transmission.

In some aspects, a method for wireless communication may include applying one or more spreading sequences to a set of modulation symbols of a data set to generate spread modulation symbols; applying a scrambling sequence to the spread modulation symbols to generate a set of scrambled symbols; and transmitting a waveform based at least in part on the set of scrambled symbols.

In some aspects, a wireless communication device for wireless communication may include one or more processors configured to apply one or more spreading sequences to a set of modulation symbols of a data set to generate spread modulation symbols; apply a scrambling sequence to the spread modulation symbols to generate a set of scrambled symbols; and transmit a waveform based at least in part on the set of scrambled symbols.

In some aspects, a non-transitory computer-readable medium may store one or more instructions for wireless communication. The one or more instructions, when executed by one or more processors of a user equipment, may cause the one or more processors to apply one or more spreading sequences to a set of modulation symbols of a data set to generate spread modulation symbols; apply a scrambling sequence to the spread modulation symbols to generate a set of scrambled symbols; and transmit a waveform based at least in part on the set of scrambled symbols.

In some aspects, an apparatus for wireless communication may include means for applying one or more spreading sequences to a set of modulation symbols of a data set to generate spread modulation symbols; means for applying a scrambling sequence to the spread modulation symbols to generate a set of scrambled symbols; and means for transmitting a waveform based at least in part on the set of scrambled symbols.

In some aspects, a method for wireless communication may include processing a data stream, which is associated with non-orthogonal multiple access with resource spreading, based at least in part on a codebook of spreading sequences that is conditioned using a cell-specific mask sequence; or precoding a block of the data stream using a cell-specific precoding sequence; and transmitting the data stream after processing the data stream based at least in part on the codebook that is conditioned using the cell-specific mask sequence, or after precoding the block of the data stream using the cell-specific precoding sequence.

In some aspects, a user equipment for wireless communication may include one or more processors configured to process a data stream, which is associated with non-orthogonal multiple access with resource spreading, based at least in part on a codebook of spreading sequences that is conditioned using a cell-specific mask sequence; or precode a block of the data stream using a cell-specific precoding sequence; and transmit the data stream after processing the data stream based at least in part on the codebook that is conditioned using the cell-specific mask sequence, or after precoding the block of the data stream using the cell-specific precoding sequence.

In some aspects, a non-transitory computer-readable medium may store one or more instructions for wireless communication. The one or more instructions, when executed by one or more processors of a user equipment, may cause the one or more processors to process a data stream, which is associated with non-orthogonal multiple access with resource spreading, based at least in part on a codebook of spreading sequences that is conditioned using a cell-specific mask sequence; or precode a block of the data stream using a cell-specific precoding sequence; and transmit the data stream after processing the data stream based at least in part on the codebook that is conditioned using the cell-specific mask sequence, or after precoding the block of the data stream using the cell-specific precoding sequence.

In some aspects, an apparatus for wireless communication may include means for processing a data stream, which is associated with non-orthogonal multiple access with resource spreading, based at least in part on a codebook of spreading sequences that is conditioned using a cell-specific mask sequence; or means for precoding a block of the data stream using a cell-specific precoding sequence; and means for transmitting the data stream after processing the data stream based at least in part on the codebook that is conditioned using the cell-specific mask sequence, or after precoding the block of the data stream using the cell-specific precoding sequence.

A method of wireless communication at a UE is described. The method may include identifying a data symbol vector for an uplink transmission over a set of frequency resources in one or more symbol periods, applying a UE-specific signature sequence to the data symbol vector in a time domain to obtain a spread data symbol vector, and dividing the spread data symbol vector into a plurality of sets of time domain symbols, wherein each set of the plurality of sets of time domain symbols has a length equal to a first number of frequency resources of the set of frequency resources. The method may further include applying a scrambling vector to each of the plurality of sets of time domain symbols, performing respective time to frequency domain transforms on the plurality of sets of time domain symbols to obtain a plurality of frequency domain signals, mapping the plurality of frequency domain signals to the set of frequency resources, generating a time domain waveform for the uplink transmission based on a frequency to time domain transform of the plurality of frequency domain signals mapped to the set of frequency resources, and transmitting the time domain waveform to a receiver.

An apparatus for wireless communication at a UE is described. The apparatus may include means for identifying a data symbol vector for an uplink transmission over a set of frequency resources in one or more symbol periods, means for applying a UE-specific signature sequence to the data symbol vector in a time domain to obtain a spread data symbol vector, and means for dividing the spread data symbol vector into a plurality of sets of time domain symbols, wherein each set of the plurality of sets of time domain symbols has a length equal to a first number of frequency resources of the set of frequency resources. The apparatus may further include means for applying a scrambling vector to each of the plurality of sets of time domain symbols, means for performing respective time to frequency domain transforms on the plurality of sets of time domain symbols to obtain a plurality of frequency domain signals, means for mapping the plurality of frequency domain signals to the set of frequency resources, means for generating a time domain waveform for the uplink transmission based on a frequency to time domain transform of the plurality of frequency domain signals mapped to the set of frequency resources, and means for transmitting the time domain waveform to a receiver.

Another apparatus for wireless communication at a UE is described. The apparatus may include a processor, memory in electronic communication with the processor, and instructions stored in the memory. The instructions may be operable to cause the processor to identify a data symbol vector for an uplink transmission over a set of frequency resources in one or more symbol periods, apply a UE-specific signature sequence to the data symbol vector in a time domain to obtain a spread data symbol vector, and divide the spread data symbol vector into a plurality of sets of time domain symbols, wherein each set of the plurality of sets of time domain symbols has a length equal to a first number of frequency resources of the set of frequency resources. The instructions may be further operable to cause the processor to apply a scrambling vector to each of the plurality of sets of time domain symbols, perform respective time to frequency domain transforms on the plurality of sets of time domain symbols to obtain a plurality of frequency domain signals, map the plurality of frequency domain signals to the set of frequency resources, generate a time domain waveform for the uplink transmission based on a frequency to time domain transform of the plurality of frequency domain signals mapped to the set of frequency resources, and transmit the time domain waveform to a receiver.

A non-transitory computer-readable medium for wireless communication at a UE is described. The non-transitory computer-readable medium may include instructions operable to cause a processor to identify a data symbol vector for an uplink transmission over a set of frequency resources in one or more symbol periods, apply a UE-specific signature sequence to the data symbol vector in a time domain to obtain a spread data symbol vector, and divide the spread data symbol vector into a plurality of sets of time domain symbols, wherein each set of the plurality of sets of time domain symbols has a length equal to a first number of frequency resources of the set of frequency resources. The instructions may be further operable to cause the processor to apply a scrambling vector to each of the plurality of sets of time domain symbols, perform respective time to frequency domain transforms on the plurality of sets of time domain symbols to obtain a plurality of frequency domain signals, map the plurality of frequency domain signals to the set of frequency resources, generate a time domain waveform for the uplink transmission based on a frequency to time domain transform of the plurality of frequency domain signals mapped to the set of frequency resources, and transmit the time domain waveform to a receiver.

In some aspects, a method for wireless communication performed by a user equipment (UE) may include selecting a hopping pattern for a data stream for which a spreading technique is to be performed using short codes, wherein the hopping pattern is for spreading sequence selection, ordering, and concatenation in a time domain; and processing the data stream based at least in part on the hopping pattern.

In some aspects, a user equipment for wireless communication may include one or more processors configured to select a hopping pattern for a data stream for which a spreading technique is to be performed using short codes, wherein the hopping pattern is for spreading sequence selection, ordering, and concatenation in a time domain; and process the data stream based at least in part on the hopping pattern.

In some aspects, a non-transitory computer-readable medium may store one or more instructions for wireless communication. The one or more instructions, when executed by one or more processors of a user equipment, may cause the one or more processors to select a hopping pattern for a data stream for which a spreading technique is to be performed using short codes, wherein the hopping pattern is for spreading sequence selection, ordering, and concatenation in a time domain; and process the data stream based at least in part on the hopping pattern.

In some aspects, an apparatus for wireless communication may include means for selecting a hopping pattern for a data stream for which a spreading technique is to be performed using short codes, wherein the hopping pattern is for spreading sequence selection, ordering, and concatenation in a time domain; and means for processing the data stream based at least in part on the hopping pattern.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a user equipment, in accordance with various aspects of the present disclosure.

FIG. 8 is a diagram illustrating an example process performed, for example, by a user equipment, in accordance with various aspects of the present disclosure.

DETAILED DESCRIPTION

Figure 1:
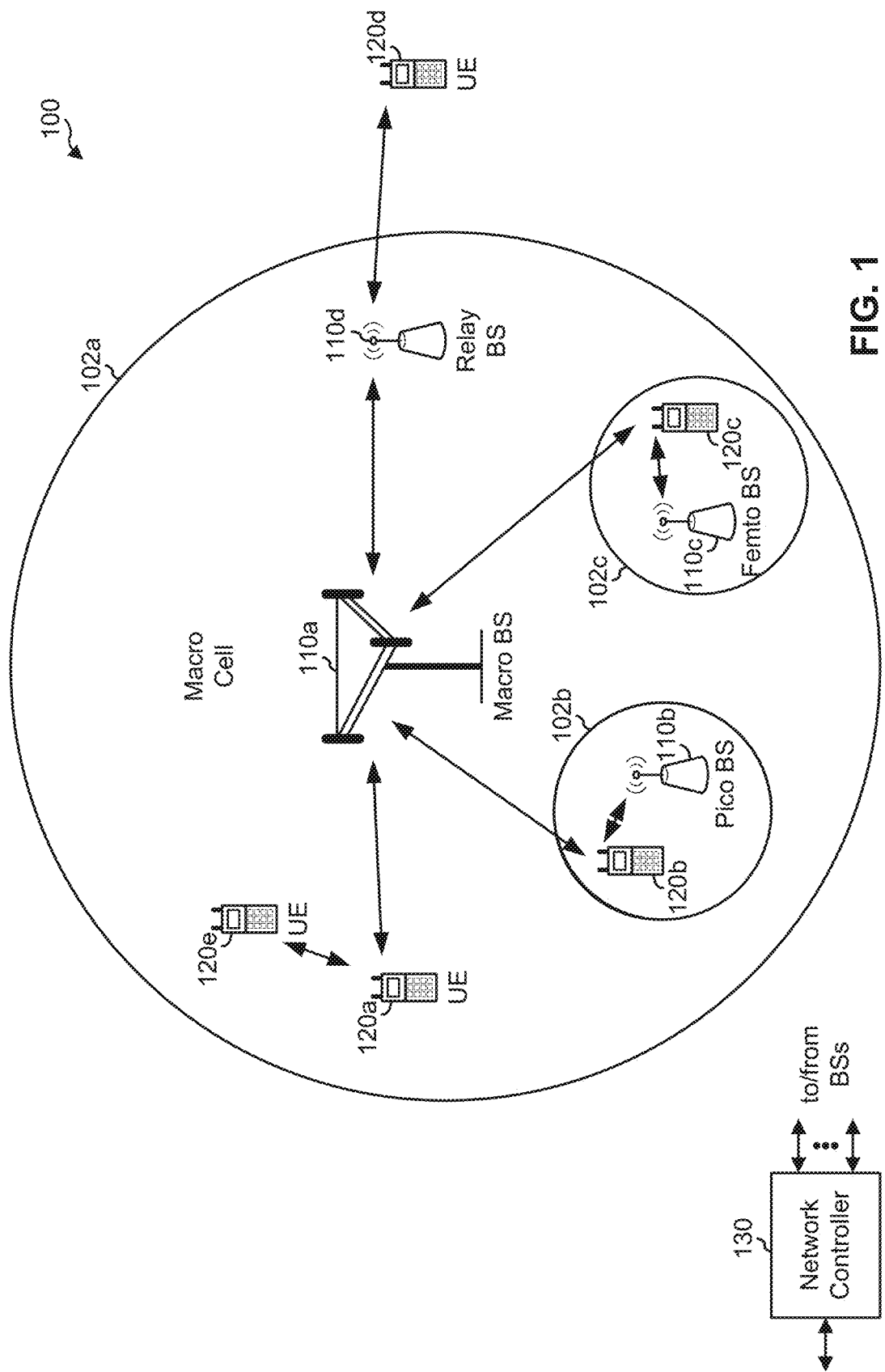
FIG. 1 is a block diagram conceptually illustrating an example of a wireless communication network, in accordance with various aspects of the present disclosure.

In 5G/NR, some communications may use CP-OFDM with non-orthogonal multiple access (NOMA). NOMA refers to transmission/reception schemes characterized by non-orthogonal, inter-UE resource allocation (e.g. time, frequency, code, space, etc.). One technique for achieving NOMA is resource spread multiple access (RSMA). In general, NOMA can use a variety of waveforms, including CP-OFDM and DFT-s-OFDM, which may work on the uplink. CP-OFDM with NOMA may be used for both DL and UL transmission.

For a NOMA UE using CP-OFDM, a data tone transmission of the UE may be orthogonalized using OFDM. That is, the data tones belonging to a single UE will not interference with each other. Among multiple NOMA UEs belonging to the same cell, resource allocations of the multiple NOMA UEs are non-orthogonal. That is, data tones/spreading codes/time slots/spatial beams of the UEs will interfere with each other. This mutual interference may be controlled or configured by the NOMA codebook. At the receiver side, by invoking advanced algorithms for multi-user detection, such controlled interference can be mitigated. As a result, the sum rate of NOMA can be enhanced.

However, some NOMA techniques, such as RSMA, may increase a peak-to-average power ratio (PAPR) of the waveform. This may be exacerbated as an overloading ratio of the waveform (e.g., a number of NOMA UEs divided by a spreading factor of the waveform) increases. A high PAPR is undesirable because an amplifier requires a higher backoff than for a low PAPR. In addition, due to the non-orthogonality of the signal, inter-cell interference may have a more destructive effect than for other (e.g., orthogonal) approaches.

Some techniques and apparatuses described herein provide for precoding or processing techniques to reduce PAPR. For example, some techniques and apparatuses described herein may provide for reduction of PAPR using a single-stage RSMA technique or a two-stage RSMA technique. This reduction may be achieved using a cell-specific sequence, such as a cell-specific mask sequence and/or a cell-specific precoding sequence. Thus, the PAPR of a NOMA signal may be reduced while preserving a low-cross-correlation property of the NOMA signal. Furthermore, these cell-specific sequences may be configured to reduce inter-cell interference of the NOMA UEs, thereby improving radio performance of the NOMA UEs.

For a NOMA UE using CP-OFDM, a data tone transmission of the UE may be orthogonalized using OFDM. That is, the data tones belonging to a single UE will not interference with each other. Among multiple NOMA UEs belonging to the same cell, resource allocations of the multiple NOMA UEs are non-orthogonal. That is, data tones/spreading codes/time slots/spatial beams of the UEs will interfere with each other. This mutual interference may be controlled or configured by the NOMA codebook. At the receiver side, by invoking advanced algorithms for multi-UE detection, such controlled interference can be mitigated. As a result, the sum rate of NOMA can be enhanced.

Techniques and apparatuses described herein may provide spreading techniques to reduce PAPR of the waveform. For example, some techniques and apparatuses described herein may provide for selection of a time-domain hopping pattern for selecting a short code to use to spread a data stream. In some aspects, different UEs may be assigned different hopping patterns, and the different hopping patterns may be configured to improve PAPR of the waveform. In this way, PAPR may be reduced, thereby permitting a lower transmit power backoff to be used for UEs.

In some wireless communications systems, user equipment (UEs), base stations, or both may communicate using NOMA. Utilizing NOMA may include introducing non-orthogonality in time, frequency, or code when transmitting messages. For example, for uplink transmissions, multiple UEs may transmit messages to a base station in a same set of time and frequency resources, and without code orthogonality. The base station may differentiate between messages from different UEs based on other parameters, such as power or non-orthogonal spreading codes. For example, the base station may assign the UEs different power coefficients or UE-specific spreading codes, and the base station may decode the overlapping messages based on this information. The base station may receive a message from a single UE based on the UE-specific power coefficient or spreading code, and may mitigate or cancel other messages received from different UEs in the same resources as if the messages are noise or interference (e.g., using successive interference cancellation (SIC)). In wireless communications systems implementing NOMA, increases in the system load (e.g., the number of served UEs) may increase the interference between UE transmissions. A base station may implement spreading or interleaving techniques in order to improve the performance of such a system. In some cases, NOMA may be implemented for both uplink and downlink transmissions, as well as grant-free and grant-based transmissions, and may allow the system to meet varying demands on low latency, high-throughput, improved fairness, etc.

UEs transmitting using NOMA in the uplink may implement discrete Fourier transform-spread-orthogonal frequency division multiplexing (DFT-s-OFDM) waveforms. Utilizing DFT-s-OFDM waveforms may achieve a greater link budget than other types of waveforms for NOMA transmissions. However, generating a DFT-s-OFDM waveform may incur impacts to PAPR and may introduce inter-cell interference. These effects may reduce the throughput of messages transmitted from UEs to base stations using NOMA DFT-s-OFDM waveforms.

To mitigate these negative effects of the waveform generation process, a UE may implement time domain spreading between a UE-specific spreading process and an oversampling process. For example, when generating a DFT-s-OFDM waveform, a UE may identify data to transmit in certain uplink resources (e.g., a set of frequency resources and a number of OFDM symbol periods). The UE may perform UE-specific spreading or scrambling on this data—which may contribute to increased PAPR—and may determine sets of time domain symbols based on these UE-specific functions. In order to mitigate the potential increase to PAPR, and correspondingly improve the throughput of the UE data to a base station, the UE may apply a scrambling code to the sets of time domain symbols. This scrambling code may be an example of a cell-specific scrambling code, a symbol-specific scrambling code, or a cell and symbol specific scrambling code. Implementing this scrambling code may additionally reduce the probability of inter-cell interference. After this cell or symbol specific scrambling, the UE may transform the time domain symbols into frequency domain signals. The UE may pad the frequency domain signals to support a frequency to time domain transformation, and may additionally oversample symbols in the time domain to match the padded frequency information. The UE may generate the NOMA DFT-s-OFDM waveform based on mapping the frequency domain signals to frequency resources and performing the frequency to time domain transformation on the frequency domain signals.

Aspects of the disclosure are initially described in the context of wireless communications systems. Additional aspects of the disclosure are described with respect to a waveform generation process and a process. Aspects of the disclosure are further illustrated by and described with reference to apparatus diagrams, system diagrams, and flowcharts that relate to PAPR reduction and inter-cell interference management.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, a biometric sensor/device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed. In such a case, the RAT may use a NOMA configuration for radio access of UEs covered by the RAT.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. This scheduling may be non-orthogonal in some cases (e.g., when using RSMA or another NOMA technique).

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
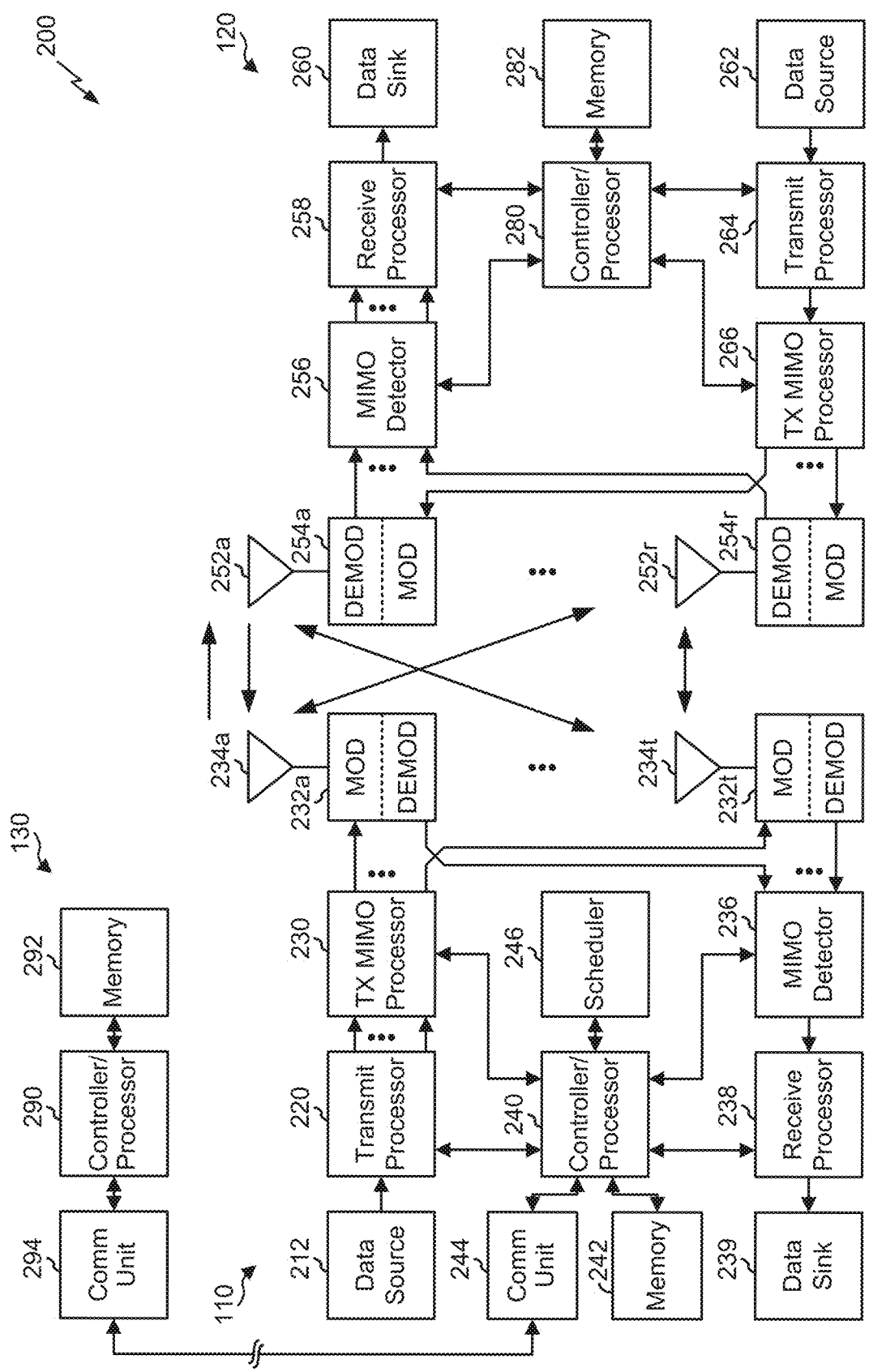
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. In some aspects, the transmit processor 264, the TX MIMO processor 266, and/or modulator 254 may encode or process the data based at least in part on a cell-specific sequence described herein, such as a cell-specific mask sequence or a cell-specific precoding sequence.

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with PAPR and inter-cell interference reduction for NOMA, as described in more detail elsewhere herein. For example, controller/processor 240 of BS 110, controller/processor 280 of UE 120, and/or any other component(s) of FIG. 2 may perform or direct operations of, for example, process 500 of FIG. 5 and/or other processes as described herein. Memories 242 and 282 may store data and program codes for BS 110 and UE 120, respectively. A scheduler 246 may schedule UEs for data transmission on the downlink and/or uplink.

Figure 16:
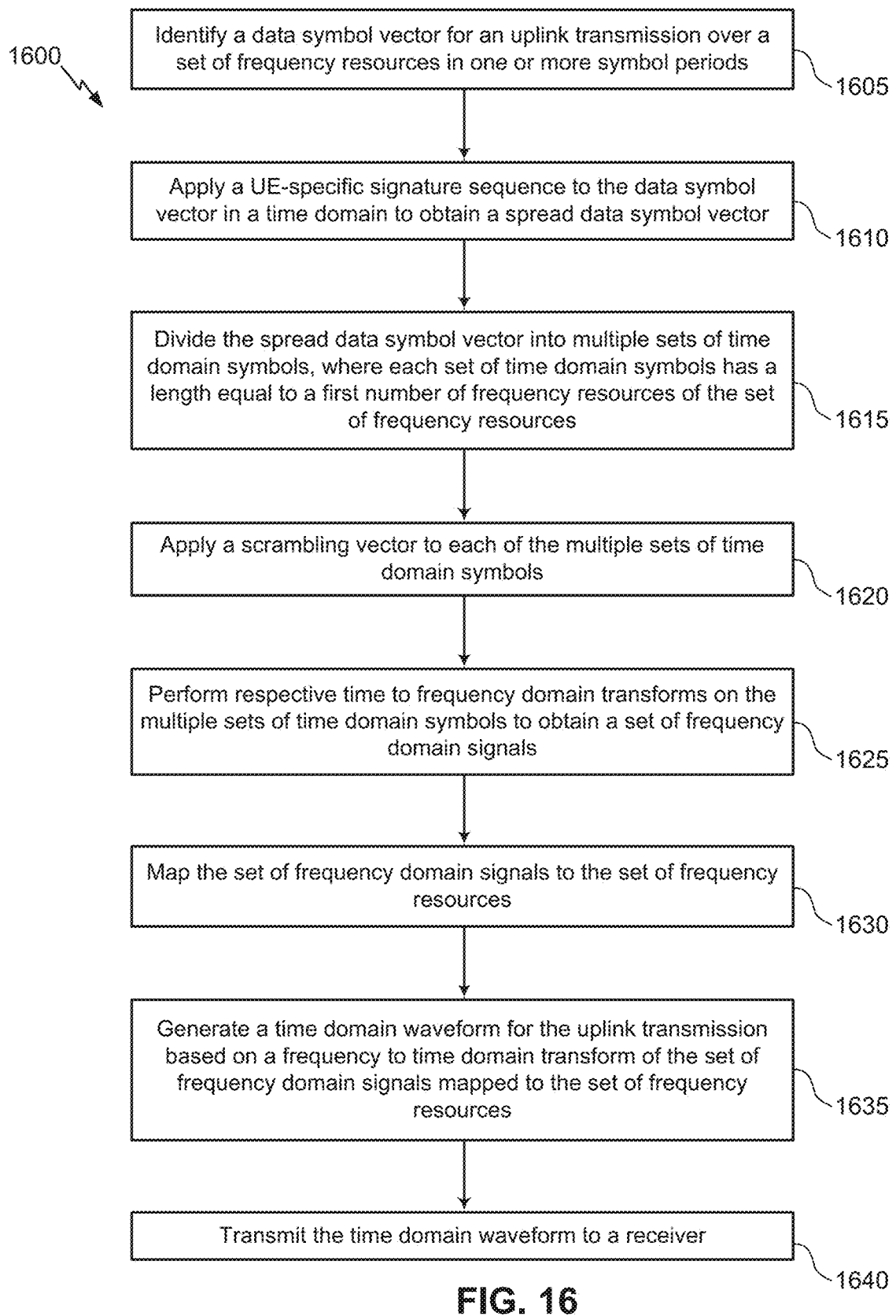
FIGS. 16 through 18 illustrate processes for PAPR reduction and inter-cell interference management in accordance with aspects of the present disclosure.
Figure 17:
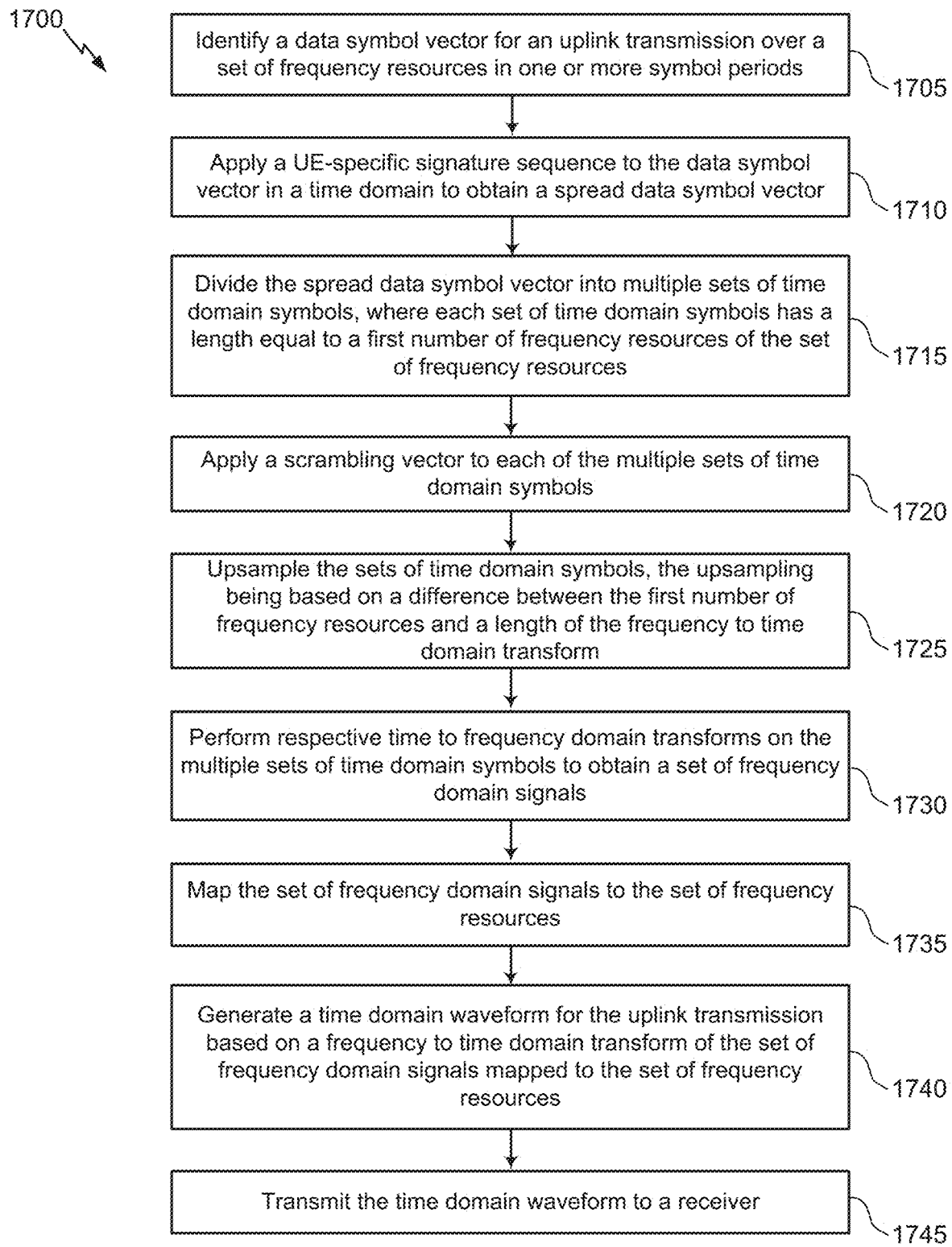
Figure 18:
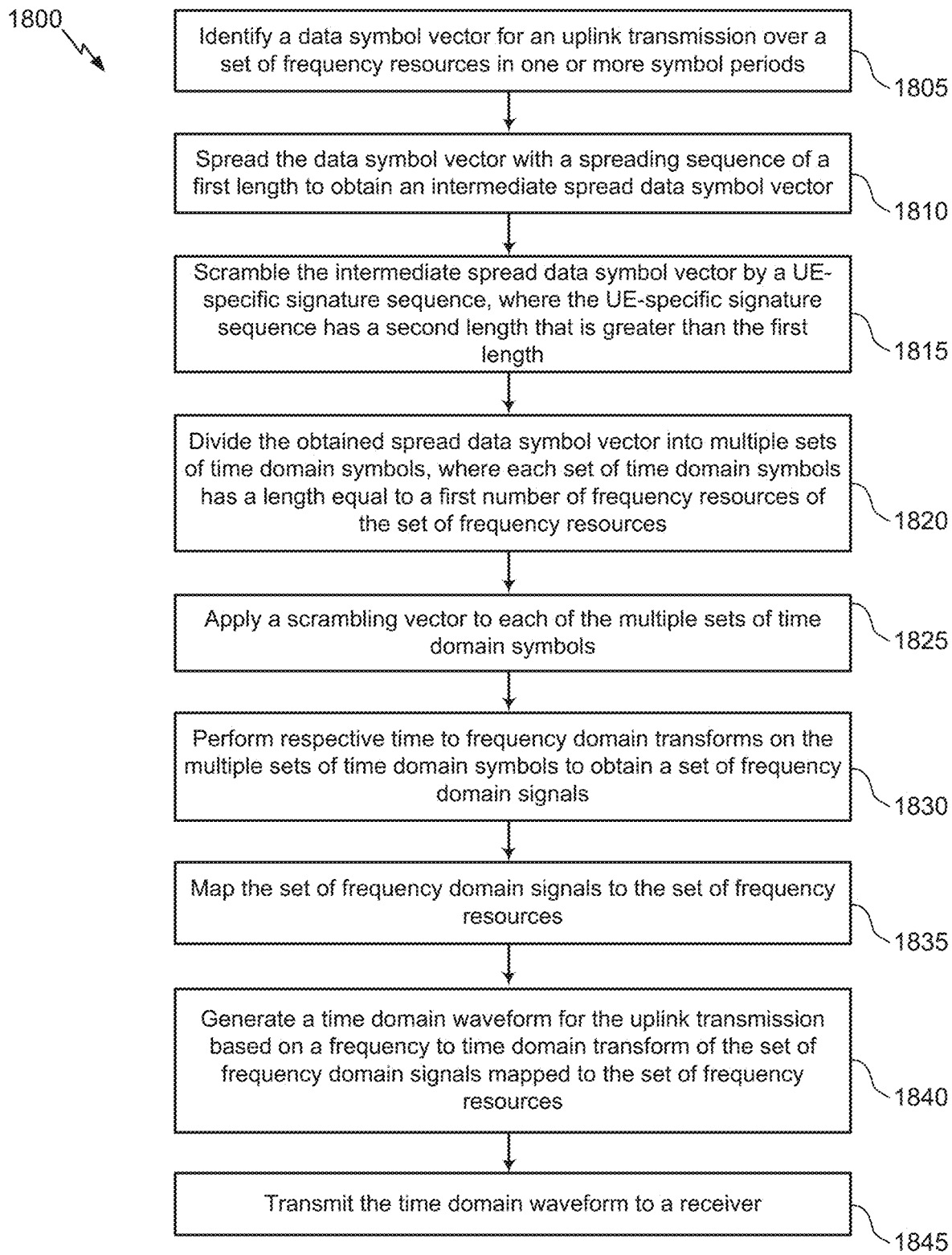
Figure 19:
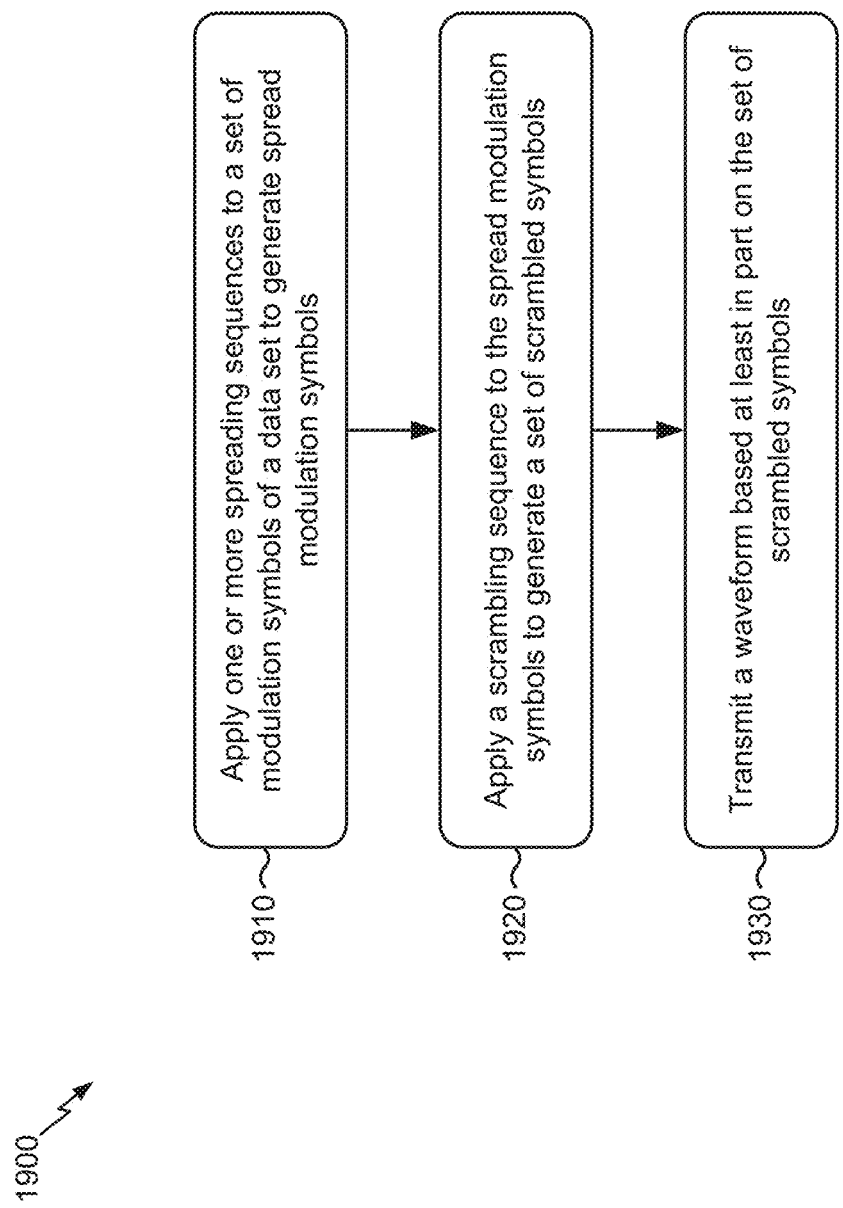
FIG. 19 is a diagram illustrating an example process performed, for example, by a wireless communication device, in accordance with various aspects of the present disclosure.

The stored program codes, when executed by controller/processor 280 and/or other processors and modules at UE 120, may cause the UE 120 to perform operations described with respect to process 500 of FIG. 5, process 800 of FIG. 8, process 1600 of FIG. 16, process 1700 of FIG. 17, process 1800 of FIG. 18, process 1900 of FIG. 19, and/or the like. A scheduler 246 may schedule UEs for data transmission on the downlink and/or uplink.

In some aspects, UE 120 may include means for processing a data stream, which is associated with non-orthogonal multiple access with resource spreading, based at least in part on a codebook of spreading sequences that is conditioned using a cell-specific mask sequence; means for precoding a block of the data stream using a cell-specific precoding sequence; means for transmitting the data stream after processing the data stream based at least in part on the codebook that is conditioned using the cell-specific mask sequence, or after precoding the block of the data stream using the cell-specific precoding sequence; means for applying one or more spreading sequences to a set of modulation symbols of a data set to generate spread modulation symbols; means for applying a scrambling sequence to the spread modulation symbols to generate a set of scrambled symbols; means for transmitting a waveform based at least in part on the set of scrambled symbols; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
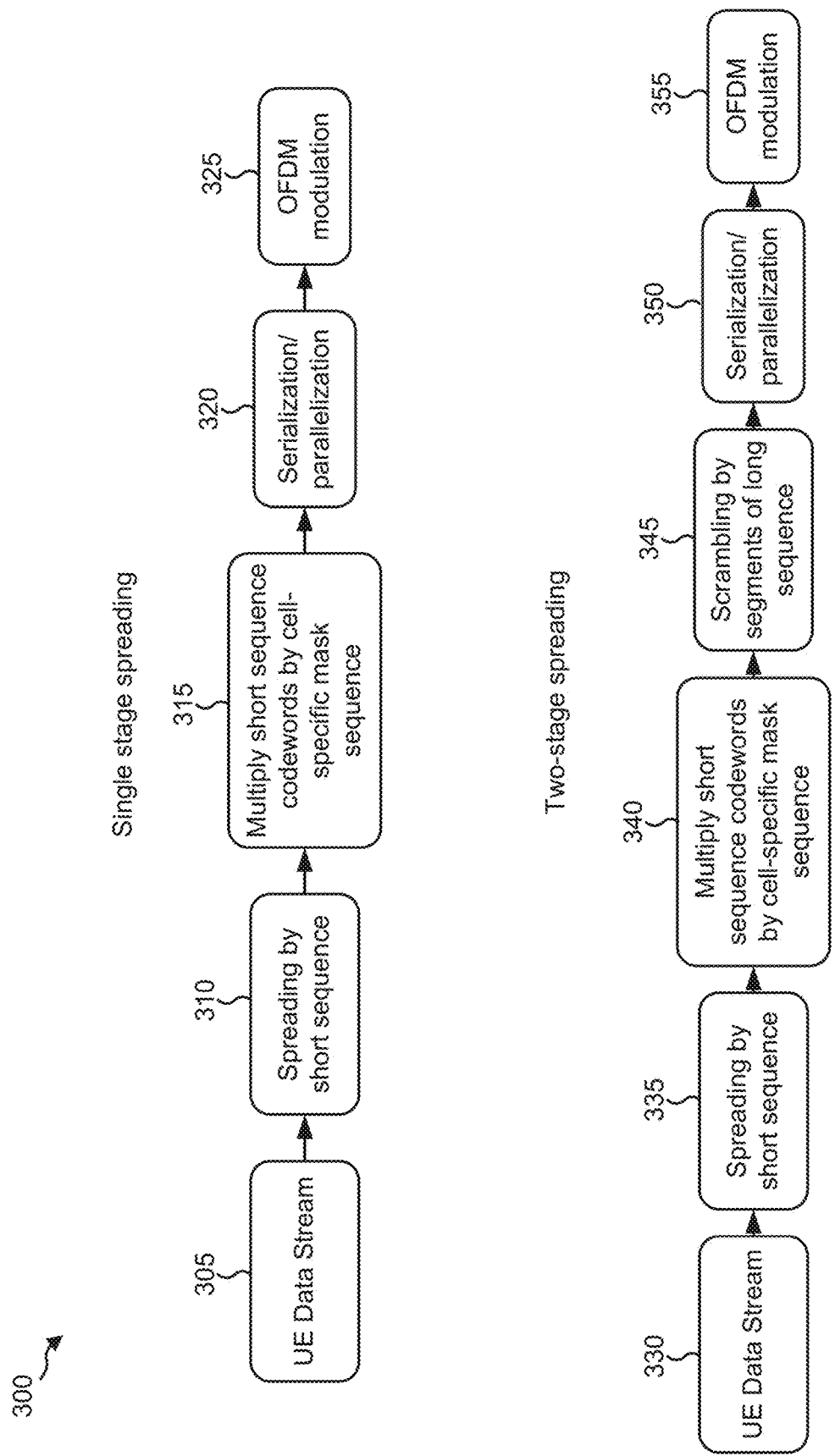
FIG. 3 is a diagram illustrating an example of processing a data stream using a cell-specific mask sequence to reduce PAPR for NOMA, in accordance with various aspects of the present disclosure.

FIG. 3 is a diagram illustrating an example 300 of processing a data stream using a cell-specific mask sequence to reduce PAPR for NOMA, in accordance with various aspects of the present disclosure.

As shown in FIG. 3, the block diagram shown by reference numbers 305-325 may relate to a single-stage spreading technique, whereas the block diagram shown by reference numbers 330-355 may relate to a two-stage spreading technique. As shown by reference number 305, a UE 120 may obtain (e.g., receive, generate, determine, etc.) a data stream. As shown by reference number 310, the UE 120 may perform spreading of the data stream using a short sequence.

For example, the UE 120 may be associated with a codebook of short sequences. The short sequences may be configured to achieve NOMA (e.g., based at least in part on resource spread multiple access or another technique). By spreading the data stream using the short sequence, NOMA may be achieved.

As a more particular example, the codebook may be represented by a matrix $\mathbb{C}$ of size N by K: $\mathbb{C} \triangleq [C_0^T C_1^T \ldots C_{N-1}^T]^T$, wherein $C_n \triangleq [c_n^0 c_n^1 \ldots c_n^{K-1}]$ identifies a short sequence used by UE n. In the above matrix, K is a spreading factor/resource size and N is a number of UEs. For NOMA transmissions, N>K.

As shown by reference number 315, the UE 120 may multiply the short sequence codewords by a cell-specific mask sequence. For example, the cell-specific mask sequence may be a function of a cell identifier of a cell associated with the UE 120. In some aspects, the cell-specific mask sequence may include a constant-amplitude zero autocorrelation (CAZAC) sequence, a chirp sequence, a discrete Fourier transform sequence, and/or the like. For example, the cell-specific mask sequence may be configured to reduce PAPR and inter-cell interference of the UE 120 when combined with the codewords. By multiplying the codewords of the codebook by the cell-specific mask sequence, PAPR and inter-cell interference may be reduced.

As a more particular example, for a cell-specific mask sequence represented by $W_q$, $W_q \triangleq [w_q(0) w_q(1) \ldots w_q(K-1)]$, wherein q is a function of the cell identifier. The modified short sequence used by UE 120 (e.g., after multiplication by $W_q$) may be represented by $C'_n \triangleq [w_q(0)c_n^0 w_q(1)c_n^1 \ldots w_q(K-1)c_n^{K-1}]$. In other words, the UE 120 may replace codebook $\mathbb{C}$ by $\mathbb{C}'$, as shown here:

$$\mathbb{C}' \triangleq [C'_0{}^T C'_1{}^T \ldots C'_{N-1}{}^T]^T.$$

The above operations may improve PAPR based at least in part on increasing systematic randomness of the NOMA signal. For example, the legacy NOMA codebook described in connection with reference number 310 may have good correlation properties but poor PAPR, since PAPR was not the controlled variable when creating the codebook. The cell-specific mask sequence (and the cell-specific precoding sequence described in connection with FIG. 4, below) modify the codebook so that the correlation properties are preserved while reducing the PAPR of NOMA signals generated using the codebook. Furthermore, since the sequences are cell-specific based at least in part on a cell identifier, inter-cell interference may be reduced.

As shown by reference number 320, the UE 120 may perform a serialization to parallelization operation with regard to the processed data stream. As shown by reference number 325, the UE 120 may perform OFDM modulation of the processed data stream. In this way, the UE 120 reduces PAPR of the NOMA waveform, and reduces inter-cell interference of the NOMA waveform, while preserving the correlation properties of the NOMA waveform.

As shown by reference number 330, for the two-stage spreading technique, the UE 120 may obtain a data stream. As shown by reference number 335, the UE 120 may perform spreading using the codebook of the short sequence, as described in more detail above. As shown by reference number 340, the UE 120 may use the cell-specific mask sequence to generate the codebook, as described in more detail above. This reduces PAPR of a signal generated using the two-stage spreading technique while preserving correlation of the signal, and reduces inter-cell interference.

As shown by reference number 345, the UE 120 may perform scrambling of the processed data stream using segments of a long sequence. For example, the long sequence may be a Gold sequence, a PN sequence, a chirp sequence, and/or the like. The combination of spreading and scrambling may be termed a two-stage spreading technique. The two-stage spreading technique may have better PAPR performance than the one-stage spreading technique. However, by processing the data stream using the cell-specific mask sequence, the PAPR may be further improved.

In some aspects, parameters for $W_q$ and $\mathbb{C}$ can be dynamically signaled, or semi-persistently configured by BS 110. For example, the parameters may be configured using downlink control information, radio resource configuration (RRC) messaging, and/or the like.

As shown by reference number 350, the UE 120 may perform a serialization to parallelization operation with regard to the processed data stream. As shown by reference number 355, the UE 120 may perform OFDM modulation of the processed data stream.

As indicated above, FIG. 3 is provided as an example. Other examples may differ from what is described with respect to FIG. 3.

Figure 4:
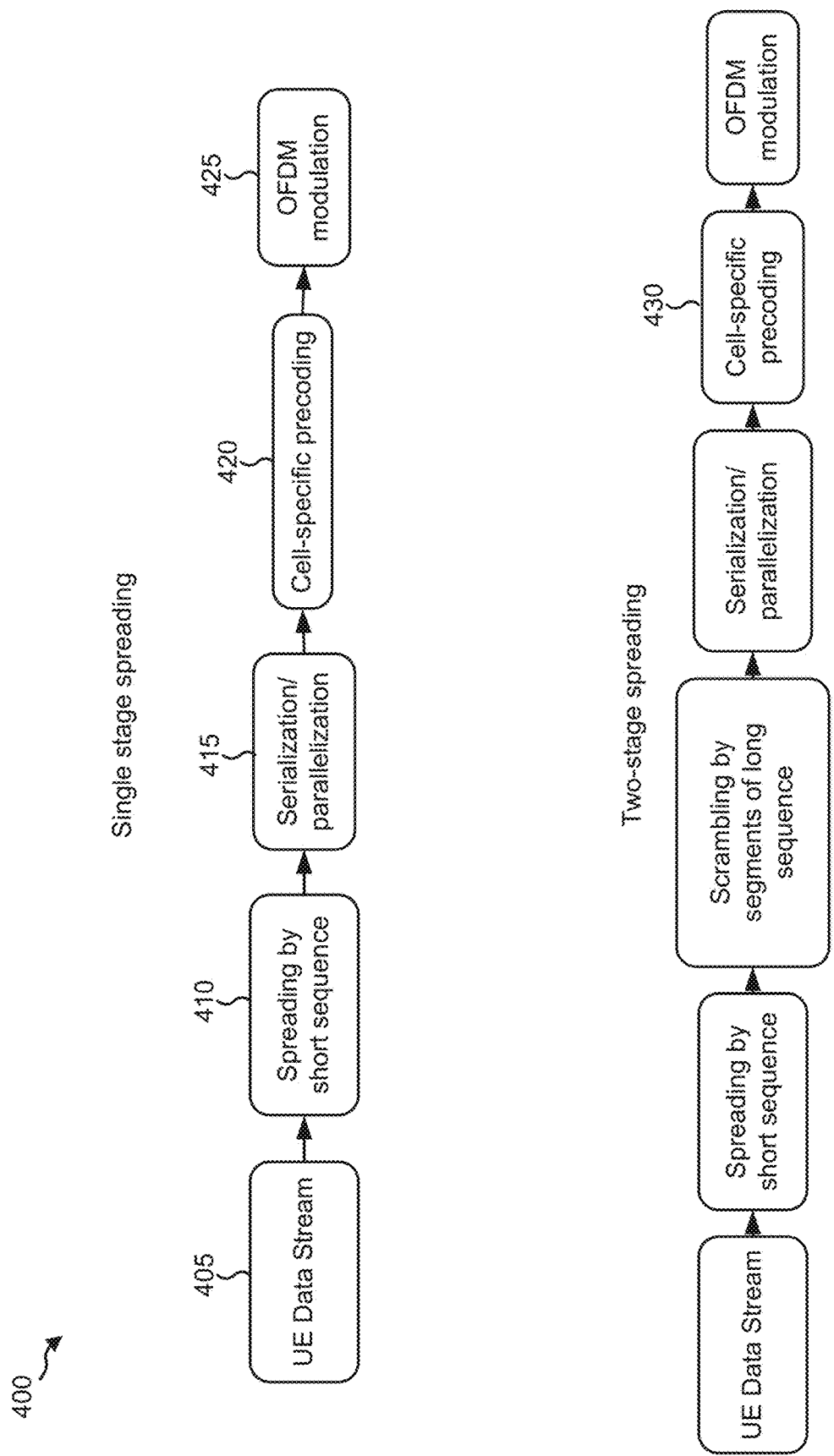
FIG. 4 is a diagram illustrating an example of processing a data stream using a cell-specific precoding sequence to reduce PAPR for NOMA, in accordance with various aspects of the present disclosure.

FIG. 4 is a diagram illustrating an example 400 of processing a data stream using a cell-specific precoding sequence to reduce PAPR for NOMA, in accordance with various aspects of the present disclosure. FIG. 4 shows examples using a single-stage spreading technique (reference numbers 405-425) and a two-stage spreading technique (reference number 430).

As shown in FIG. 4, and by reference number 405, the UE 120 may obtain a data stream. As shown by reference number 410, the UE 120 may perform spreading of the data stream using a short sequence. For example, the UE 120 may perform spreading as described above in connection with reference number 310 of FIG. 3. In some aspects, the UE 120 may perform the spreading based at least in part on a codebook that is multiplied by a cell-specific mask sequence, as described in connection with reference number 315 of FIG. 3, above. In other words, the operations described in FIGS. 3 and 4 can be performed with regard to the same data stream, thereby further improving PAPR and reducing inter-cell interference. As shown by reference number 415, the UE 120 may perform a serialization to parallelization operation with regard to the data stream.

As shown by reference number 420, the UE 120 may precode a block of the data stream using a cell-specific precoding sequence. For example, the UE 120 may precode the block of the data stream (e.g., a concatenation or repetition of a spreading sequence for the block) in the frequency domain. The cell-specific precoding sequence may reduce inter-cell interference based at least in part on being cell-specific (e.g., based at least in part on being a function of a cell identifier). Furthermore, the cell-specific precoding sequence may be configured to reduce PAPR of the data stream while preserving the correlation properties of the data stream. In this way, an amplifier of the UE 120 may use a lower backoff value, thereby improving range and throughput of the UE 120.

As a more particular example, the cell-specific precoding sequence may be a cell-specific sequence $Z_{r,L}^q$, where q may be a function of a cell identifier, L is a size of a resource element allocated for UE 120, r is a root index, and L and r are relatively prime. Examples of such a sequence include a CAZAC sequence with length K, a DFT sequence with length K, or a chirp sequence with length K. In some aspects, parameters of $Z_{r,L}^q$ may be broadcast by the BS 110 to UEs covered by the BS 110 before starting the NOMA transmission. As above, parameters for $Z_{r,L}^q$ can be dynamically signaled, or semi-persistently configured by the BS 110 (e.g., using downlink control information, RRC messaging, and/or the like). As shown by reference number 425, the UE 120 may perform OFDM modulation on the precoded data stream.

As shown by reference number 430, the two-stage spreading case may be similar. For example, the precoding may be performed before OFDM modulation is performed on the precoded data stream. Notably, performing the precoding using the cell-specific precoding sequence (in the two-stage spreading case and the single stage spreading case) may provide PAPR performance that surpasses a baseline PAPR performance without spreading or with legacy RSMA, as described in more detail in connection with FIGS. 6A-6C.

As indicated above, FIG. 4 is provided as an example. Other examples may differ from what is described with respect to FIG. 4.

FIG. 5 is a diagram illustrating an example process 500 performed, for example, by a UE, in accordance with various aspects of the present disclosure. Example process 500 is an example where a UE (e.g., UE 120) performs PAPR and inter-cell interference reduction for NOMA. In some aspects, process 500 may be performed by a device other than a UE, such as a BS (e.g., BS 110) and/or the like.

As shown in FIG. 5, in some aspects, process 500 may include processing a data stream, which is associated with non-orthogonal multiple access with resource spreading, based at least in part on a codebook of spreading sequences that is conditioned using a cell-specific mask sequence (block 510). For example, the UE may process (e.g., using controller/processor 280, transmit processor 264, the TX MIMO processor 266, modulator 254, and/or the like) a data stream. The data stream may be associated with NOMA with resource spreading (e.g., using RSMA or a different resource spreading technique). The UE may process the data stream based at least in part on a codebook of spreading sequences. The codebook of spreading sequences may be conditioned using (e.g., multiplied by) a cell-specific mask sequence.

As shown in FIG. 5, in some aspects, process 500 may include precoding a block of the data stream using a cell-specific precoding sequence (block 520). For example, the UE may precode (e.g., using controller/processor 280, transmit processor 264, the TX MIMO processor 266, modulator 254, and/or the like) a block of the data stream using a cell-specific precoding sequence. In some aspects, the UE 120 may perform blocks 510 and 520 for the same data stream. In some aspects, the UE 120 may perform only one of block 510 or 520 for a data stream.

As shown in FIG. 5, in some aspects, process 500 may include transmitting the data stream after processing the data stream based at least in part on the codebook that is conditioned using the cell-specific mask sequence, or after precoding the block of the data stream using the cell-specific precoding sequence (block 530). For example, the UE may transmit (e.g., using controller/processor 280, transmit processor 264, TX MIMO processor 266, MOD 254, antenna 252, and/or the like) the data stream. In some aspects, the UE may transmit the data stream after processing the data stream using the codebook that is conditioned using the cell-specific mask sequence. Additionally, or alternatively, the UE may transmit the data stream after precoding a block of the data stream using the cell-specific precoding sequence.

Process 500 may include additional aspects, such as any single aspect and/or any combination of aspects described below and/or in connection with one or more other processes described elsewhere herein.

In some aspects, the codebook identifies short spreading sequences for non-orthogonal resource spreading of the data stream. In some aspects, the cell-specific mask sequence is based at least in part on a cell identifier associated with the UE. In some aspects, the cell-specific mask sequence is based at least in part on a constant amplitude zero autocorrection (CAZAC) sequence, a chirp sequence, or a discrete Fourier transform sequence. In some aspects, the cell-specific mask sequence is configured to reduce peak to power average ratio (PAPR) and inter-cell interference, without modifying the correlation properties of intra-cell UEs performing non-orthogonal multiple access.

In some aspects, parameters for the codebook or the cell-specific mask sequence are signaled dynamically. In some aspects, parameters for the codebook or the cell-specific mask sequence are configured semi-persistently. In some aspects, processing the data stream is performed before scrambling the data stream using a long sequence. In some aspects, the cell-specific precoding sequence comprises a chirp sequence or a constant amplitude zero auto-correction (CAZAC) sequence. In some aspects, the cell-specific precoding sequence is configured to reduce peak to power average ratio (PAPR) and inter-cell interference. In some aspects, parameters relating to the codebook or the cell-specific precoding sequence are received by the UE before the data stream is transmitted by the UE. In some aspects, parameters relating to the codebook or the cell-specific precoding sequence are dynamically signaled to the UE. In some aspects, parameters relating to the codebook or the cell-specific precoding sequence are configured semi-persistently. In some aspects, precoding the data stream is performed after resource spreading and/or scrambling of the data stream. In some aspects, the precoding is performed in the frequency domain.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6A:
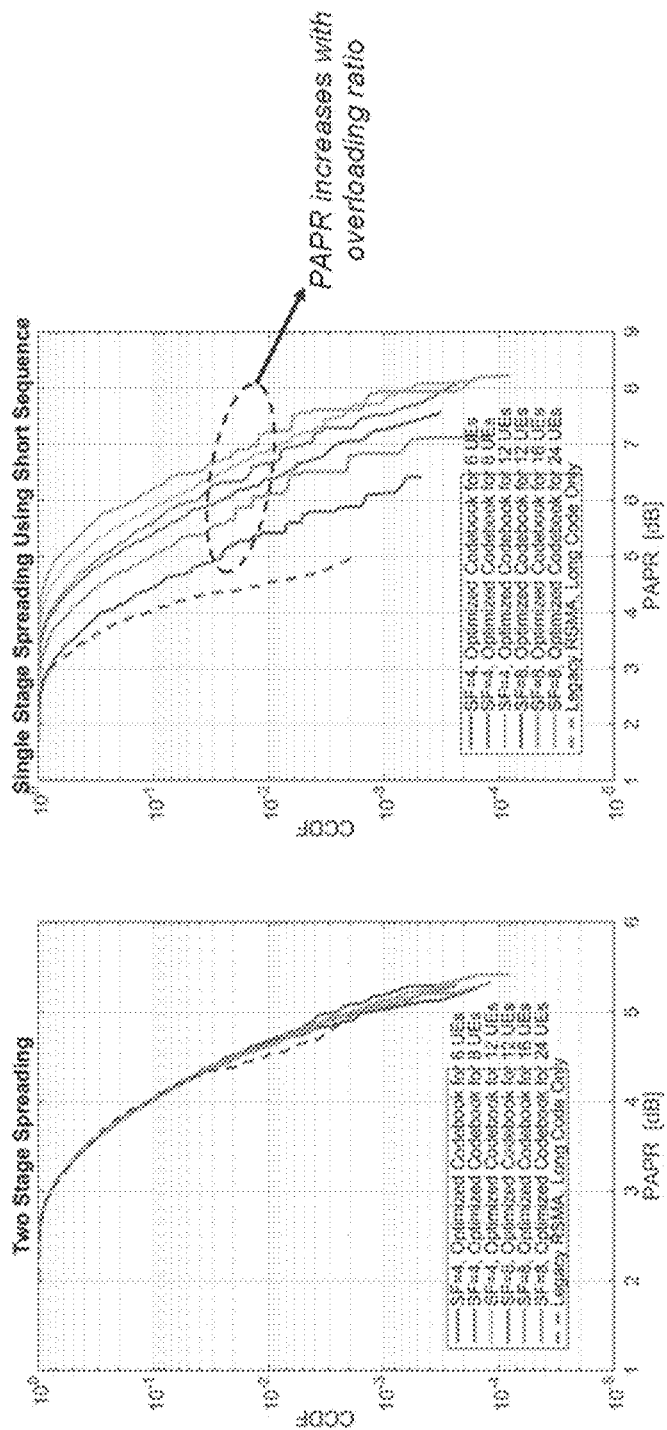
FIGS. 6A-6C are diagrams illustrating examples of performance improvements associated with use of a cell-specific mask sequence or a cell-specific precoding sequence, in accordance with various aspects of the present disclosure.
Figure 6B:
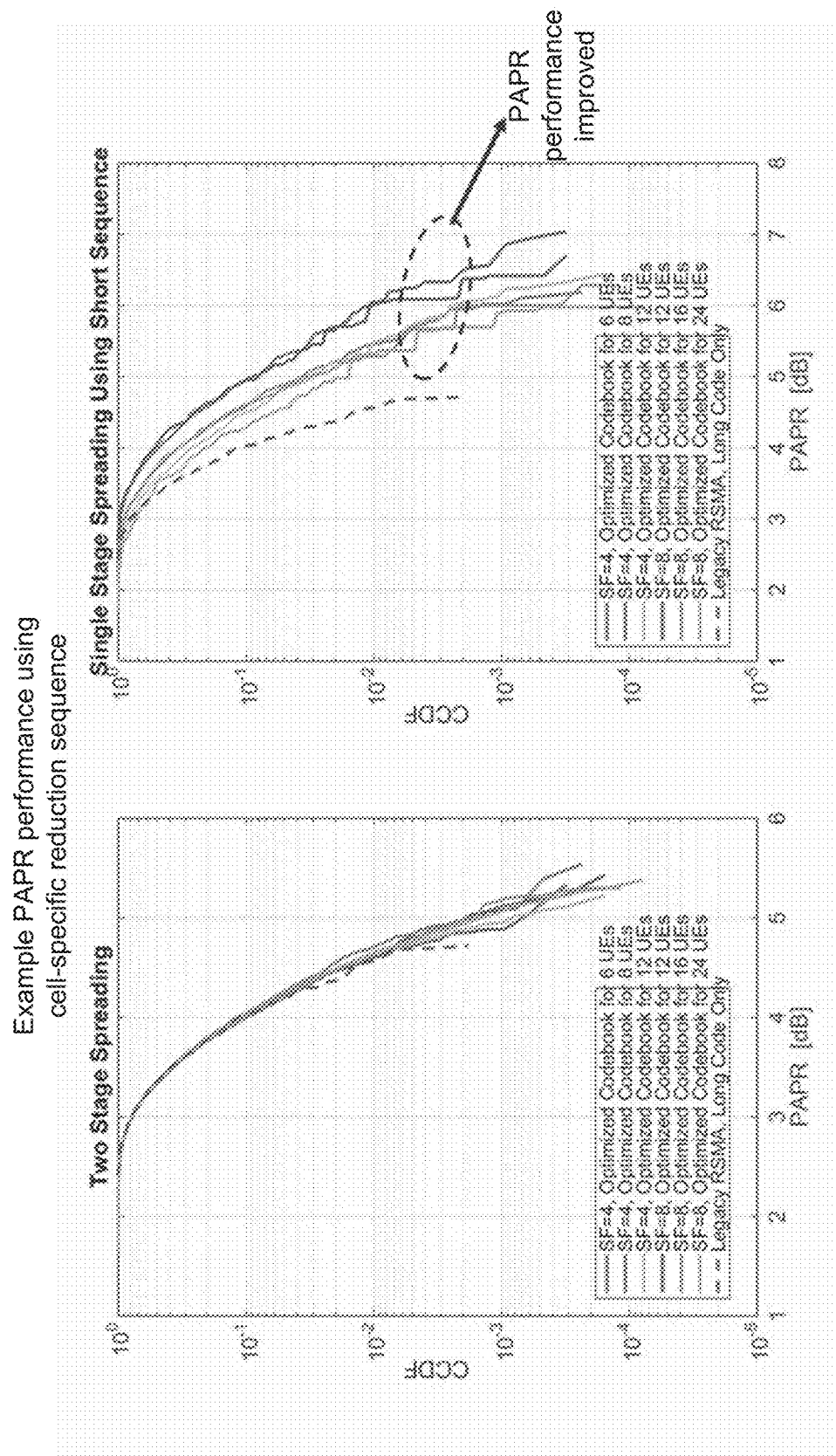
Figure 6C:
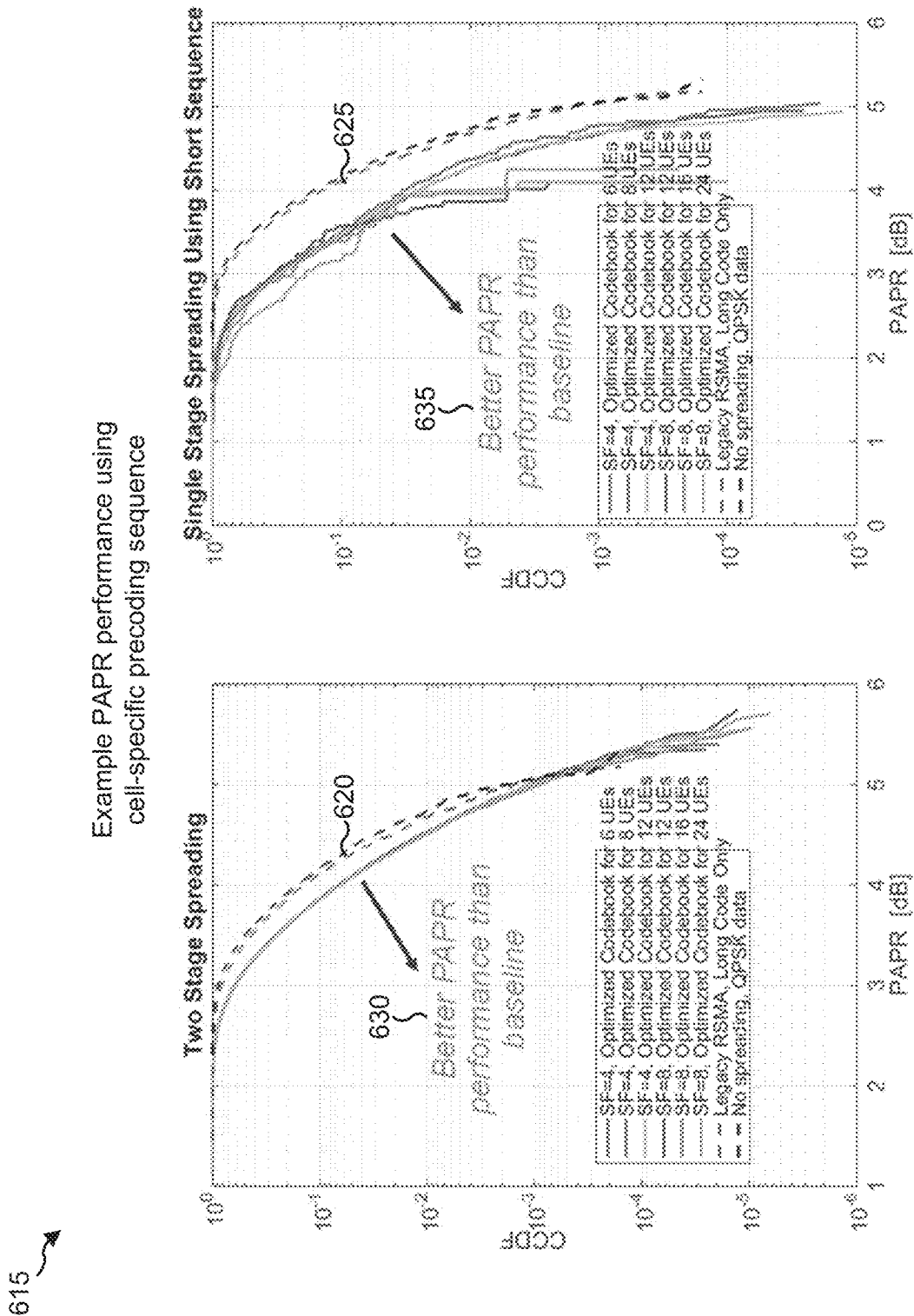

FIGS. 6A-6C are diagrams illustrating examples of performance improvements associated with use of a cell-specific mask sequence or a cell-specific precoding sequence, in accordance with various aspects of the present disclosure.

FIG. 6A shows an example 605 of PAPR performance without using the cell-specific mask sequence to condition the codebook. As can be seen, in the single-stage spreading case, the PAPR increases as the overloading ratio of the cell increases.

FIG. 6B shows an example 610 of PAPR performance while using the cell-specific mask sequence to condition the codebook. As can be seen, in comparison to FIG. 6A, PAPR performance is improved, particularly as the overloading ratio increases.

FIG. 6C shows an example 615 of PAPR performance using a cell-specific precoding sequence. The baseline performance for legacy RSMA using a long code only, and for quadrature phase shift keying (QPSK) without spreading, are shown by reference numbers 620 (for two-stage spreading) and 625 (for single stage spreading). As shown by reference number 630, the cell-specific precoding sequence may provide better PAPR performance for two-stage spreading than legacy RSMA or QPSK without spreading. As shown by reference number 635, the cell-specific precoding sequence may provide better PAPR performance for single-stage spreading than legacy RSMA or QPSK without spreading. This PAPR performance increase may be more significant as the overloading factor increases.

As indicated above, FIGS. 6A-6C are provided as examples. Other examples may differ from what is described with respect to FIGS. 6A-6C.

Figure 7A:
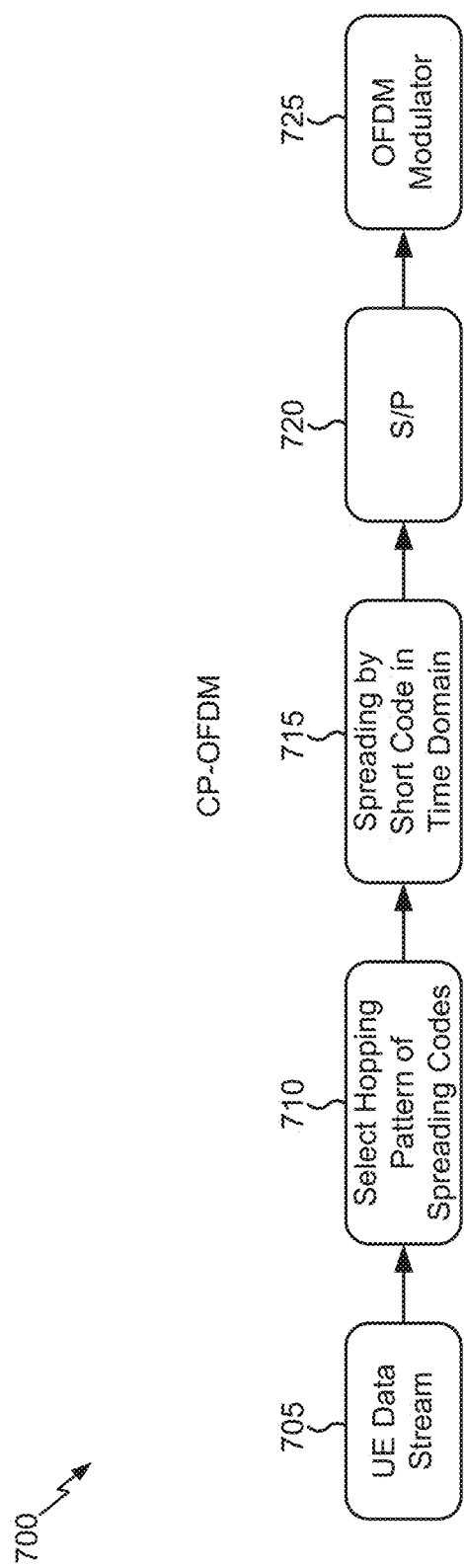
FIGS. 7A-7C are diagrams illustrating examples of time-domain spreading for NOMA, in accordance with various aspects of the present disclosure.
Figure 7B:
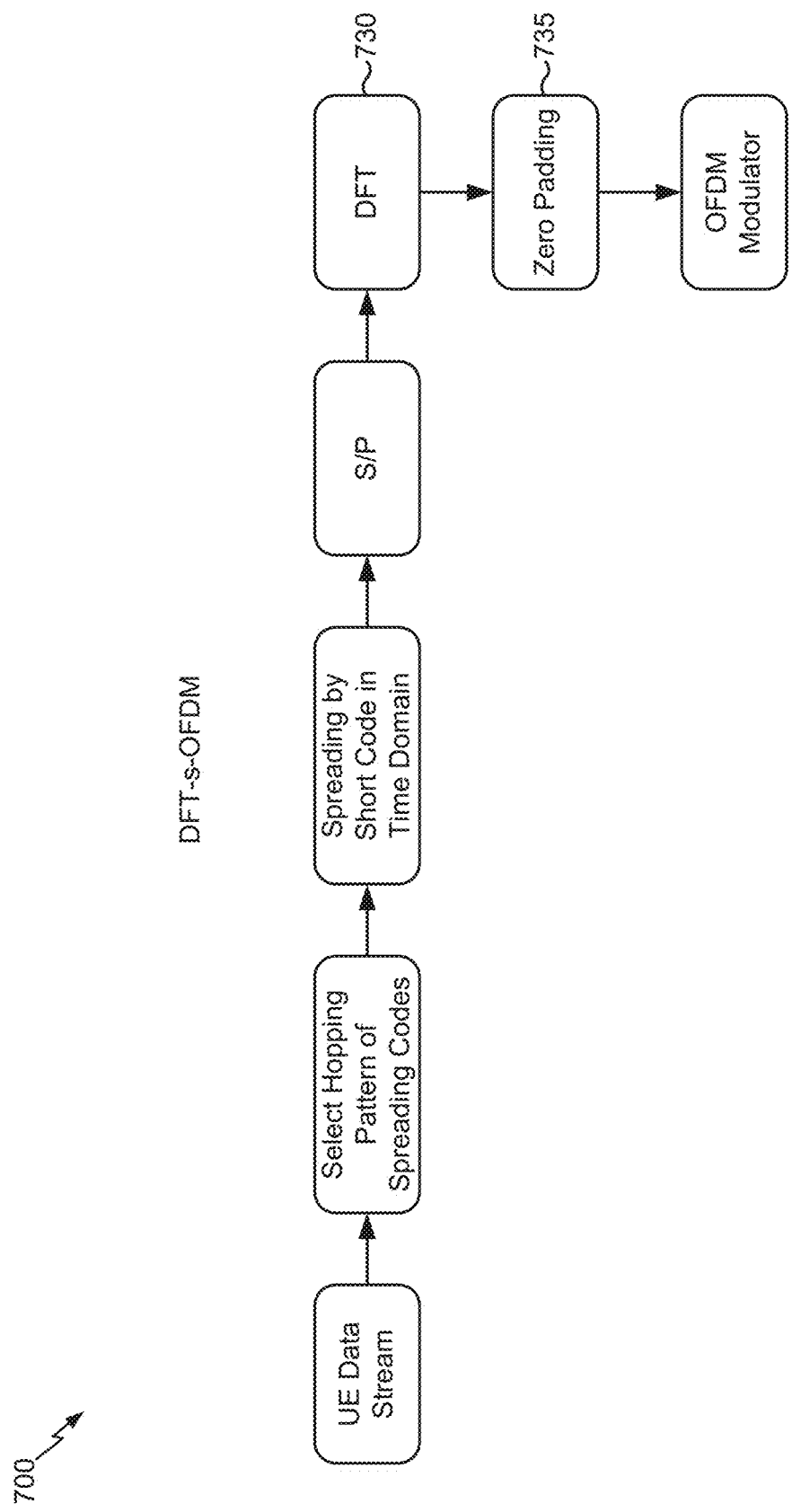
Figure 7C:
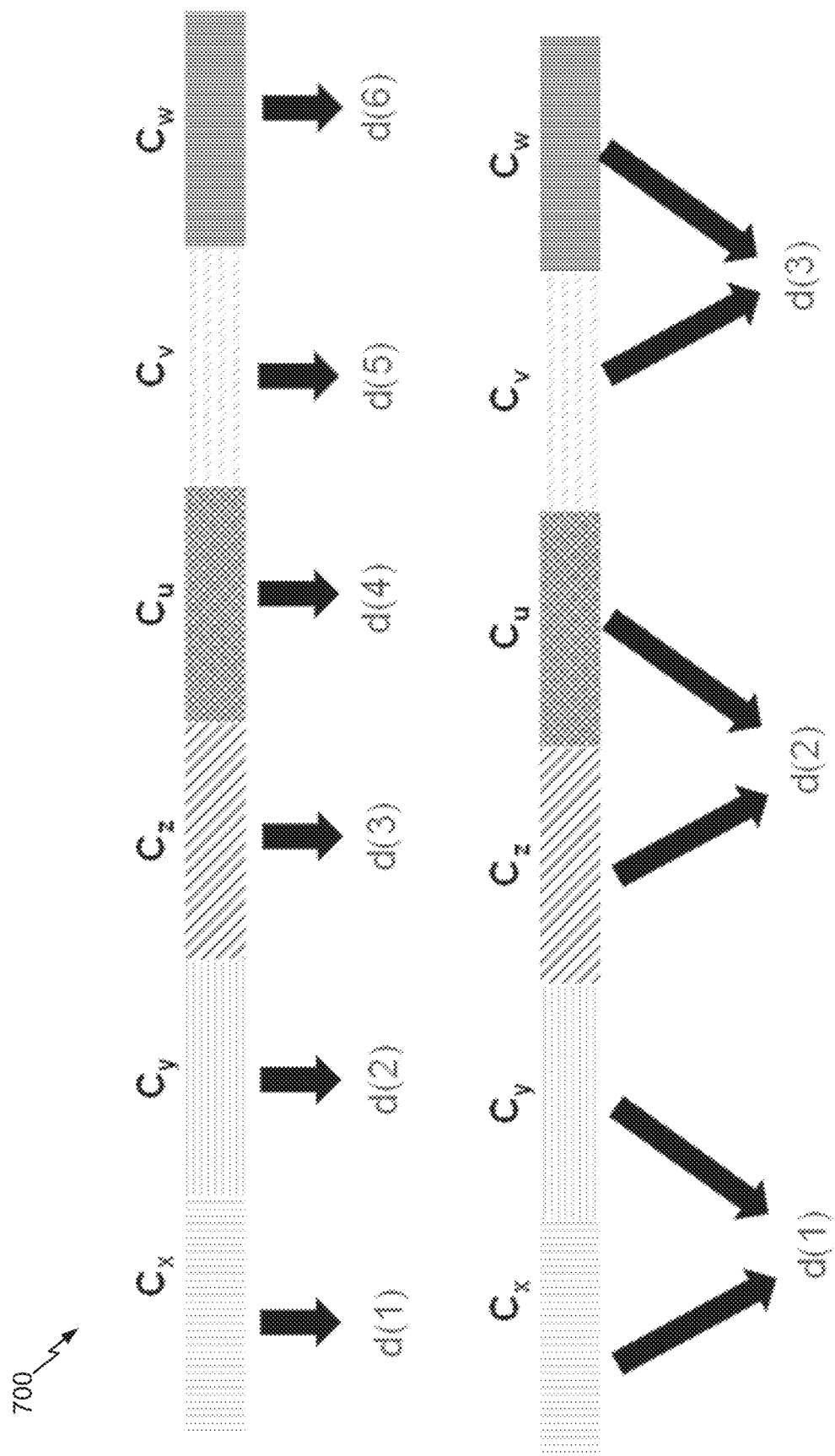

FIGS. 7A-7C are diagrams illustrating examples 700 of time-domain spreading for NOMA, in accordance with various aspects of the present disclosure.

FIG. 7A shows an example of time-domain spreading for a CP-OFDM transmission. As shown by reference number 705, a UE 120 may obtain (e.g., receive, generate, determine, etc.) a data stream. As shown by reference number 710, the UE 120 may select a hopping pattern of spreading codes. For example, the hopping pattern may identify a pattern for selecting a code (e.g., a spreading code) of a codebook that is to be applied to a corresponding symbol of the data stream. In some aspects, the hopping pattern may indicate that a first spreading code is to be applied for a first symbol, that a second spreading code is to be applied for a second symbol, and so on.

In some aspects, the hopping pattern may be specific to UE 120. For example, different UEs 120 may be assigned different hopping patterns (e.g., based at least in part on identifiers of the UEs 120 or a different means of assigning different hopping patterns). As an example, assume that a set of UEs 120 are to use a codebook of size 6 (e.g., including 6 codewords for spreading codes) to perform spreading of respective data streams of the set of UEs 120. The codebook may be associated with indexes of {1 2 3 4 5 6}. In such a case, a first UE 120 may be associated with a hopping pattern of {1, 2, 3, 4, 5, 6}, a second UE 120 may be associated with a hopping pattern of {2, 3, 4, 5, 6, 1}, a third UE 120 may be associated with a hopping pattern of {3, 4, 5, 6, 1, 2}, and so on. In other words, each UE 120 may be associated with a different permutation of the code indexes of the codebook.

In this way, different spreading codes may be applied by different UEs 120 for each symbol of data streams for NOMA. Thus, PAPR of the different data streams may be reduced, thereby reducing a backoff performed for the UEs 120. Furthermore, this technique can be applied for various NOMA multiple-access schemes, such as resource spread multiple access, multi-user shared access, non-orthogonal coded multiple access, pattern division or interleaving based multiple access, and/or the like.

In some aspects, a UE 120 may select a subset of codewords within a codebook, such as C_x, C_y, C_z, wherein x, y, and z denote the index of the codeword within the codebook. The selection of {x, y, z} may be UE-specific. In some aspects, a UE 120 may arrange or order the subset of codewords in the order of C_x, C_y, C_z, and the ordering or permutation of the index set {x, y, z} may be UE-specific. In some aspects, the UE 120 may concatenate the subset of codewords periodically into [C_x C_y C_z] [C_x C_y C_z] [C_x C_y C_z] or a similar arrangement.

As shown by reference number 715, the UE 120 may perform spreading using short codes corresponding to codebook indexes identified by the hopping pattern. For example, in the above example, the first UE 120 may perform spreading of a first symbol using a codeword with the index 1, may perform spreading of a second symbol using a codeword with the index 2, and so on. Since each UE 120 is associated with a different permutation of the codebook, each UE 120 may apply a different short code with regard to a particular symbol. Thus, PAPR of the multiple-access waveform generated by the UEs 120 is reduced.

As shown by reference number 720, the UE 120 may perform serialization/parallelization (S/P) with regard to the processed data stream. As shown by reference number 725, the UE 120 may perform OFDM modulation with regard to the processed data stream. In some aspects, the UE 120 may transmit the processed data stream. In this way, the UE 120 generate a processed data stream using spreading techniques in a time domain, thereby reducing PAPR of the processed data stream.

FIG. 7B shows an example of time-domain spreading for a DFT-s-OFDM transmission. As shown in FIG. 7B, the UE 120 may receive or generate a data stream, as described in more detail in connection with FIG. 7A, above. As further shown, the UE 120 may select a hopping pattern, as also described in more detail in connection with FIG. 7A, above. As further shown, the UE 120 may perform spreading using a short code, identified based at least in part on the hopping pattern, in a time domain, as described in more detail in connection with FIG. 7A, above. As shown, the UE 120 may perform S/P with regard to the processed data stream, as described in more detail above.

As shown by reference number 730, the UE 120 may perform DFT spreading of the processed data stream, and, as shown by reference number 735, the UE 120 may perform zero padding of the processed data stream. For example, the UE 120 may apply DFT to the processed data stream to spread the processed data stream, and may perform zero padding with regard to the spread processed data stream. The UE 120 may perform OFDM modulation with regard to the processed data stream. In some aspects, the UE 120 may transmit the processed data stream. In this way, the UE 120 may process a data stream for NOMA transmission using DFT-s-OFDM and using a time-domain hopping pattern, which reduces PAPR of the data stream, particularly when multiple, different UEs 120 are to perform NOMA.

FIG. 7C shows examples of ordering and concatenation of codewords based at least in part on a spreading sequence. In FIG. 7C, each codeword of a codebook is represented by a rectangle with a different fill. Each symbol of a data stream is represented by d(n) (n is an integer). As shown in the top half of FIG. 7C, in some aspects, a UE 120 may spread each data symbol using one of the short codewords identified by the codebook. For example, and as shown, the UE 120 may spread data symbols as follows: {C_x*d(1)}, {C_y*d(2)}, {C_z*d(3)}, {C_u*d(4)}, {C_v*d(5)}, {C_w*d(6)}. As shown in the bottom half of FIG. 7C, in some aspects, the UE 120 may spread each data symbol using a subset of concatenated codewords (e.g., {C_x*d(1), C_y*d(1)}, {C_z*d(2), C_u*d(2)}, {C_v*d(3), C_w*d(3)}, and so on). In some aspects (not shown), the UE 120 may spread each data symbol using a concatenated codeword (e.g., {C_x*d(1), C_y*d(1), C_z*d(1)}, {C_u*d(2), C_v*d(2), C_w*d(2)}, and so on). This may provide a larger processing gain with lighter NOMA loads.

As indicated above, FIGS. 7A-7C are provided as examples. Other examples are possible and may differ from what was described with respect to FIGS. 7A-7C.

FIG. 8 is a diagram illustrating an example process 800 performed, for example, by a UE, in accordance with various aspects of the present disclosure. Example process 800 is an example where a UE (e.g., UE 120) performs time-domain spreading based at least in part on a hopping pattern for NOMA.

As shown in FIG. 8, in some aspects, process 800 may include selecting a hopping pattern for a data stream for which a spreading technique is to be performed using short codes, wherein the hopping pattern is for spreading sequence selection, ordering, and concatenation in a time domain (block 810). For example, the UE (e.g., using controller/processor 280 and/or the like) may select a hopping pattern for a data stream. In some aspects, the UE may receive information identifying the hopping pattern, and may select the hopping pattern based at least in part on the information. The data stream may be a data stream for which a spreading technique is to be performed using short codes, such as short codes of a codebook for NOMA. In some aspects, a short code may be referred to herein as a spreading sequence. The hopping pattern may be for spreading sequence selection, ordering, and concatenation in a time domain.

As shown in FIG. 8, in some aspects, process 800 may include processing the data stream based at least in part on the hopping pattern (block 820). For example, the UE (e.g., using controller/processor 280 and/or the like) may process the data stream based at least in part on the hopping pattern. In some aspects, the UE may identify particular sequences or codewords based at least in part on which to perform spreading of particular symbols or portions of the data stream.

Process 800 may include additional aspects, such as any single aspect and/or any combination of aspects described below and/or in connection with one or more other processes described elsewhere herein.

In some aspects, the UE may perform spreading of symbols of the data stream using respective short spreading codes that are identified based at least in part on the hopping pattern. In some aspects, the hopping pattern is based at least in part on a permutation of a codeword index of a codebook. In some aspects, the hopping pattern is specific to the UE. In some aspects, a codebook that identifies the short spreading codes is for non-orthogonal multiple access. In some aspects, the data stream is to be transmitted using cyclic prefix orthogonal frequency division multiplexing (CP-OFDM). In some aspects, the data stream is to be transmitted using discrete Fourier transform-spread orthogonal frequency division multiplexing (DFT-s-OFDM).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Generating a DFT-s-OFDM waveform under some NOMA transmission conditions may increase PAPR and may introduce inter-cell interference. These effects may reduce the throughput of messages transmitted from UEs 120 to base stations 110 using NOMA DFT-s-OFDM waveforms. To mitigate these negative effects of the waveform generation process, a UE 120 may implement time domain spreading between a UE-specific spreading process and an oversampling process. For example, when generating a DFT-s-OFDM waveform, a UE 120 may identify data to transmit in certain uplink resources (e.g., a set of frequency resources and a number of symbol periods). The UE 120 may perform UE-specific spreading or scrambling on this data, which may contribute to increased PAPR. As this UE-specific spreading does not take the resources for transmission into account (e.g., UE-specific spreading may be performed on a code block or transport block basis spanning multiple symbol periods), the resulting spread data vector may have inter-symbol fluctuations that result in higher PAPR. To handle this, the UE 120 may determine sets of time domain symbols using a serial-to-parallel (S/P) converter, and may apply a cell-specific scrambling code, a symbol-specific scrambling code, or a cell and symbol specific scrambling code in the time domain. This scrambling may mitigate the PAPR degradation, and correspondingly improve the throughput of the UE 120 data to a base station 110. Additionally, implementing the scrambling code may reduce the probability of inter-cell interference.

After performing the cell or symbol specific scrambling, the UE 120 may transform the time domain symbols into frequency domain signals. The UE 120 may pad the frequency domain signals to support a frequency to time domain transformation, and may additionally oversample symbols in the time domain to match the padded frequency information. The UE 120 may generate the NOMA DFT-s-OFDM waveform based on mapping the frequency domain signals to frequency resources and performing the frequency to time domain transformation on the frequency domain signals. The UE 120 may transmit the UE data to a base station 110 using the generated NOMA DFT-s-OFDM waveform.

Figure 9:
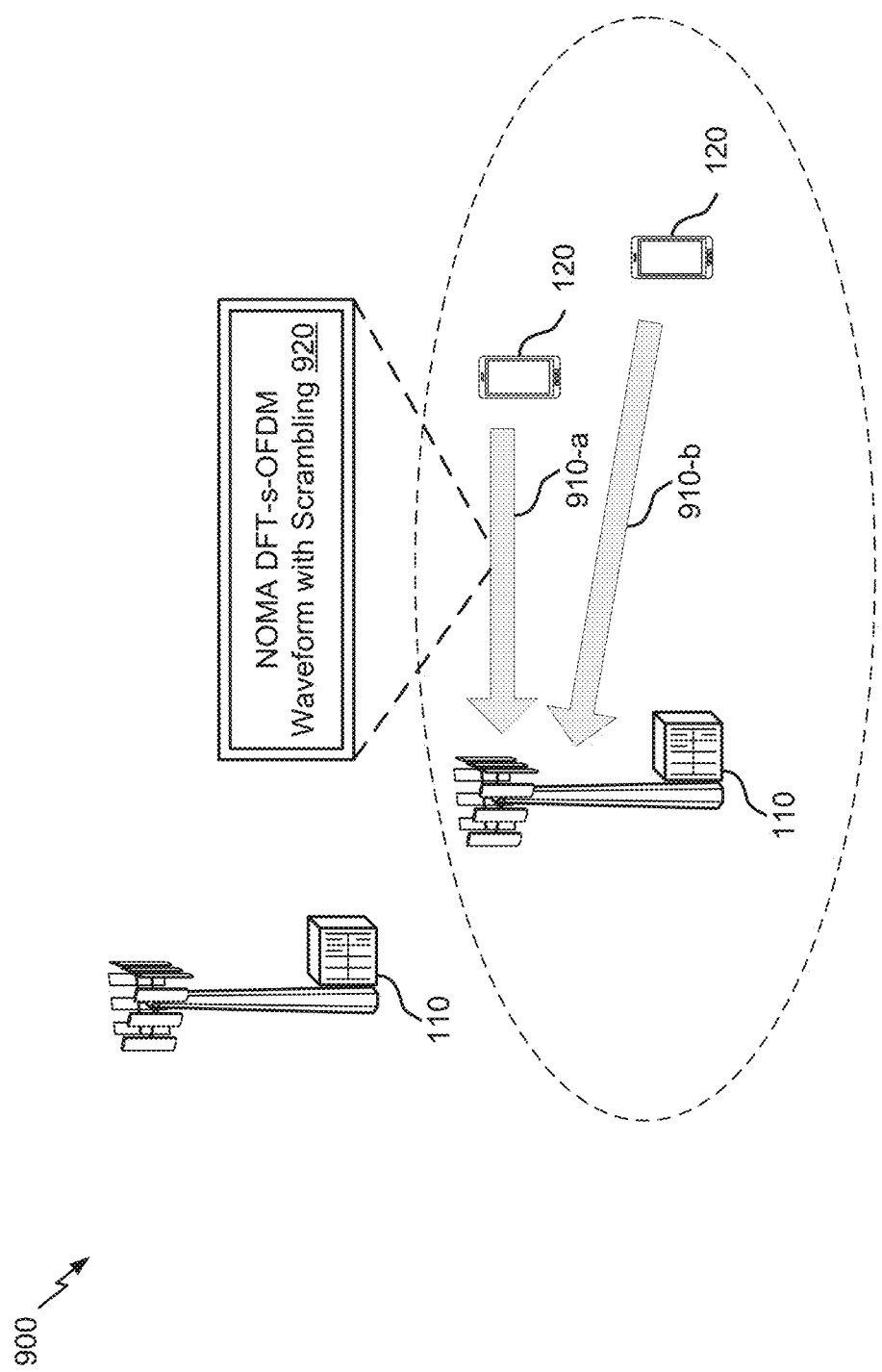
FIG. 9 illustrates an example of a wireless communications system that support peak-to-average power ratio (PAPR) reduction and inter-cell interference management, in accordance with various aspects of the present disclosure.

FIG. 9 illustrates an example of a wireless communications system 900 that supports PAPR reduction and inter-cell interference management in accordance with various aspects of the present disclosure. The wireless communications system 900 may include base station 110a and UEs 120a and 120b, which may be examples of a base station 110 and UEs 120 as described with reference to FIG. 1. Base station 110a may provide network coverage for geographic area 110a. In some cases, wireless communications system 900 may additionally include neighboring base station 110b, which may serve a neighboring cell. UEs 120a and 120b may communicate with base station 110a on uplink channels 905. For example, UE 120a may transmit on the uplink to base station 110a over uplink channel 905 a, and UE 120b may transmit to base station 110a over uplink channel 905 b. These uplink transmissions may utilize NOMA waveforms, such as NOMA DFT-s-OFDM waveforms, CP-OFDM waveforms, and/or the like. In some cases, in order to support PAPR reduction and inter-cell interference management, UEs 120 may implement scrambling processes during waveform generation, and may transmit the resulting NOMA DFT-s-OFDM waveforms with scrambling 910 over uplink channels 905.

In the wireless communications system 900, UEs 120, base stations 110, or both may utilize NOMA transmissions. Uplink NOMA transmissions may support DFT-s-OFDM waveforms, CP-OFDM waveforms, or both. In some cases, a NOMA DFT-s-OFDM waveform in the uplink may result in a greater link budget than a CP-OFDM waveform. However, NOMA DFT-s-OFDM waveforms in the uplink may experience more PAPR degradation than CP-OFDM waveforms. For example, a UE 120 generating a NOMA DFT-s-OFDM waveform may implement oversampling in the time domain. Oversampling may be performed to maintain a Nyquist sampling rate where the size of the DFT spreading block is less than the size of the IDFT used to generate the waveform for transmission. However, oversampling may result in a larger PAPR based on the tendency for spreading to cause larger signal fluctuations that can be amplified by oversampling. For example, spreading, scrambling, or both may improve correlation properties for a spread or scrambled data sequence, but may have frequency spreading components that result in large fluctuations within subsets of the data sequence. The combination of implementing spreading codes (e.g., chirp-based spreading codes) and oversampling in a waveform generation procedure may result in significant PAPR degradation.

Additionally, or alternatively, base station 110a may experience inter-cell interference. For example, base station 110a may detect NOMA transmissions sent to a base station 110 in an adjacent or nearby cell (e.g., base station 110b). If base station 110a and base station 110b use the same or similar NOMA codebooks, base station 110a may experience significant levels of inter-cell interference.

According to various aspects, UEs 120 may implement scrambling techniques to mitigate the PAPR degradation and reduce the inter-cell interference associated with NOMA DFT-s-OFDM waveforms in the uplink. For example, implementing intra-symbol period time domain scrambling may reverse the PAPR degradation from spreading or scrambling codes applied to a symbol sequence spanning several symbol periods, while preserving the improved correlation properties of the waveform. Additionally, these scrambling techniques may improve the link budget and spectral efficiency for a low complexity cost in waveform generation.

A UE 120 (e.g., UE 120a, UE 120b or both) may utilize a scrambling code to scramble one or more sets of time domain symbols. For example, the UE 120 may identify a data symbol vector (e.g., corresponding to frequency resources across one or more transmission time intervals (TTIs)) for transmission to a base station 110. The UE 120 may perform a spreading or scrambling process (e.g., UE-specific spreading or scrambling) on the data symbol vector, and may separate the resulting vector into sets of time domain symbols of a given length M. This length M may depend on the transmission block size.

The UE 120 may then perform a time domain scrambling procedure on the sets of time domain symbols of length M using the scrambling code. The scrambling code may similarly have a length M (e.g., to support the scrambling process), and a pattern of the scrambling code may be cell-specific, symbol period-specific (e.g., different scrambling codes applied for different symbol periods), or both. For example, UEs 120 communicating with base station 110a may implement a cell-specific scrambling sequence that is different than a cell-specific scrambling sequence used for communications in a neighboring cell (e.g., the cell served by base station 110b). Additionally or alternatively, the UEs 120 may use a symbol period-specific scrambling sequence for different symbol periods of a transmission. These cell-specific and symbol period-specific scrambling codes may mitigate the PAPR degradation, inter-cell interference, or both described above.

In some cases, base station 110a may utilize structured scrambling codes for the time domain scrambling. Structured scrambling codes may be generated using a low memory overhead, and may be efficiently signaled to other devices. For example, base station 110a may efficiently transmit an indication of a cell-specific structured scrambling code to UEs 120 for the UEs 120 to use in NOMA DFT-s-OFDM waveform generation.

This scrambling code may be an example of a constant amplitude zero autocorrelation (CAZAC) sequence, a complementary Golay sequence, a non-linear frequency modulated chirp sequence, or some combination of these or other sequences for performing symbol scrambling. To determine or construct the scrambling code, a UE 120 may utilize one or more of these sequences. For example, for a single CAZAC sequence implementation, the UE 120 may determine the scrambling code using a single CAZAC sequence of length M, with a prime root index, cyclic shift, or both dependent on a cell identifier, a symbol index, the length M, or some combination of these parameters. Alternatively, for a multi-CAZAC sequence implementation, the UE 120 may determine the scrambling sequence using multiple CAZAC sequences, where the summed length of the multiple CAZAC sequences totals the length M. The UE 120 may concatenate these multiple CAZAC sequences to obtain the scrambling code, where each of the CAZAC sequences has a different combination of root index and cyclic shift. Similarly, a complementary Golay sequence, a nonlinear frequency modulated chirp sequence, or any other relevant sequence may be implemented in single sequence or multi-sequence implementation, and the parameters of the sequence or sequences may be based on a cell identifier (e.g., for cell-specific scrambling), a symbol index (e.g., symbol-specific scrambling), the length of the scrambling code M, or some combination of these values. These sequences may be examples of polyphase sequences.

A UE 120 (e.g., UE 120a) may apply the scrambling code to one or more sets of time domain symbols, and then may perform time to frequency domain transforms of the time domain symbols. UE 120a may map the resulting frequency domain signals to a set of frequency resources, and may generate a time domain waveform (e.g., NOMA DFT-s-OFDM waveform with scrambling 910) using a frequency to time domain transform of the mapped frequency domain signals. UE 120 a may transmit the NOMA DFT-s-OFDM waveform with scrambling 910 to base station 110a on uplink channel 905 a. Base station 110a may receive the NOMA DFT-s-OFDM waveform with scrambling 910 and successfully decode the data symbol vector based on the improved PAPR and reduced probability of inter-cell interference corresponding to the time domain scrambling.

As indicated above, FIG. 9 is provided merely as an example. Other examples may differ from what is described with regard to FIG. 9.

Figure 10:
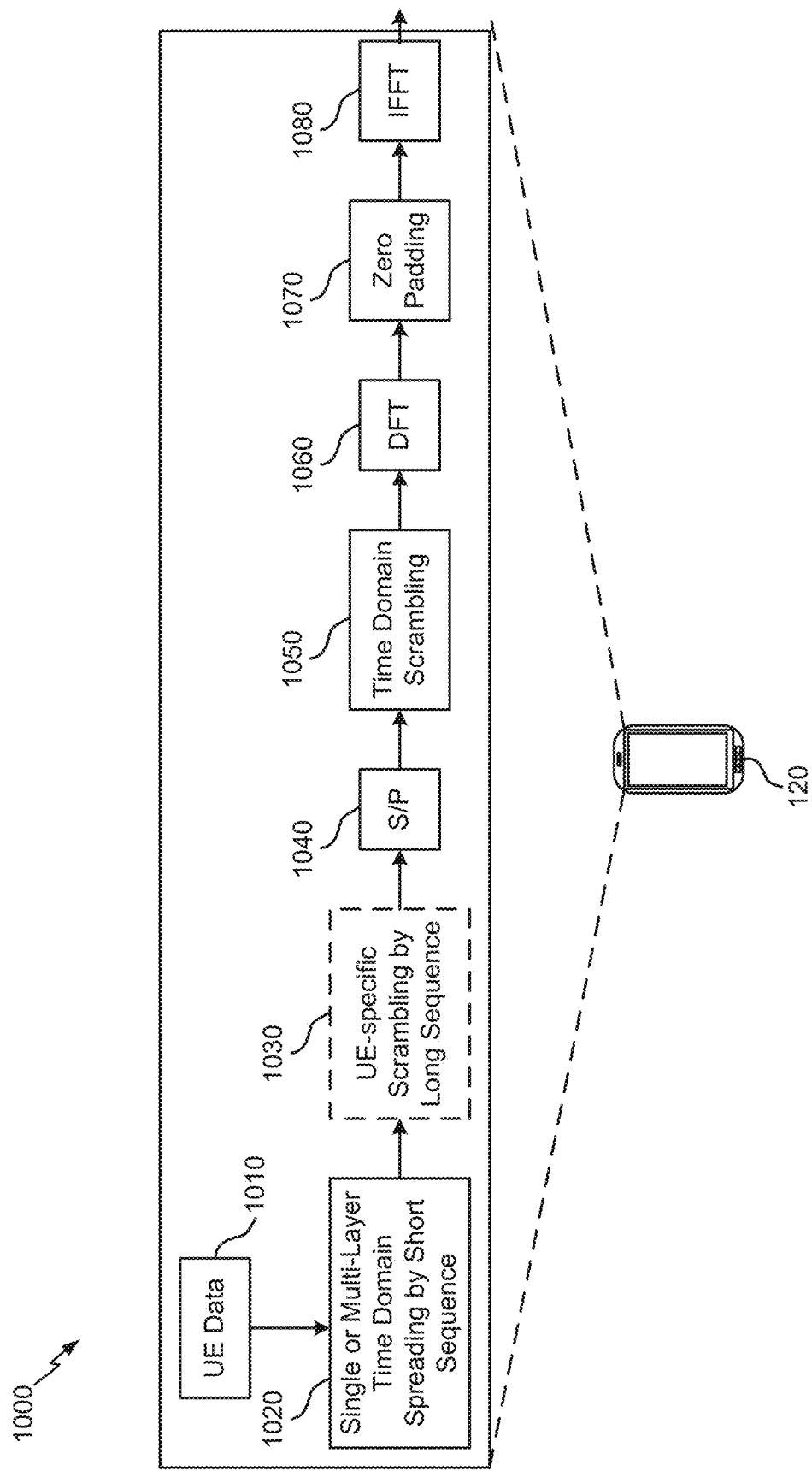
FIG. 10 illustrates an example of a waveform generation process that supports PAPR reduction and inter-cell interference management in accordance with aspects of the present disclosure.

FIG. 10 illustrates an example of a waveform generation process 1000 that supports PAPR reduction and inter-cell interference management in accordance with various aspects of the present disclosure. The waveform generation process 1000 may be performed by UE 120c, which may be an example of a UE 120 as described with reference to at least FIGS. 1 and 9. UE 120c may generate a NOMA DFT-s-OFDM waveform for uplink transmission based on UE data 1005. By implementing time domain scrambling 1025, UE 120c may reduce PAPR and manage inter-cell interference associated with the waveform generation process 1000.

UE 120c may determine UE data 1005 to transmit to a base station 110. This UE data 1005 may be an example of a data symbol vector for transmission over a set of frequency resources (e.g., one or more resource blocks) and time resources (e.g., one or more symbol periods). The data symbol vector may be modulated according to various modulation techniques (e.g., QPSK, 16-QAM, 64-QAM, etc.)

At 1010, UE 120c may perform single or multi-layer time domain spreading by a short sequence on the UE data 1005. For example, UE 120c may apply a signature sequence specific to UE 120c to the data symbol vector in the time domain. The signature sequence (e.g., the short sequence) may vary from UE 120 to UE 120 and signature sequences for some UEs may be non-orthogonal with respect to each other. For single layer spreading, UE 120c may apply the UE-specific signature sequence to the single layer to obtain a spread data symbol vector. For multi-layer spreading, UE 120c may combine the multiple layers (e.g., by superimposing the layers on top of one another to create a pseudo single layer), and may apply the UE-specific signature sequence to this combination of the multiple layers. In this way, whether the UE-specific spreading is single layer or multi-layer may be transparent to later functions of the waveform generation process 1000. In some aspects, the UE 120 may perform spreading in the frequency domain. In some aspects, the UE 120 may perform time domain and/or frequency domain spreading at a modulation symbol level.

In a single stage linear spreading implementation, the spread data symbol vector resulting from the process at 1010 may be sent to an S/P convertor at 1020. Alternatively, in a hybrid linear spreading implementation, the spread data symbol vector resulting from the process at 1010 may be an example of an intermediate spread data symbol vector. UE 120*c* may perform further scrambling processes on the intermediate spread data symbol vector at 1015. For example, UE 120*c* may perform UE-specific scrambling using a long sequence (e.g., where the long sequence is longer than the short sequence) on the intermediate spread data symbol vector in order to obtain a spread data symbol vector to pass to the S/P converter.

At 1020, UE 120*c* may perform a S/P conversion of the spread data symbol vector to obtain sets of time domain symbols of length M. This length M may correspond to the size of the set of frequency resources allocated to the UE for transmission of the data symbol vector. The number of sets may correspond to the number of symbols periods for transmission. These sets of time domain symbols may be input into a time domain scrambling process at 1025.

At 1025, UE 120*c* may perform cell-specific, symbol-specific, or cell and symbol-specific time domain scrambling on the sets of time domain symbols. For example, UE 120*c* may apply a scrambling vector to each of the sets of time domain symbols. The scrambling vector may be an example of a scrambling code as described above (e.g., with reference to FIG. 9), and may be different for different cells served by base stations 110 and may vary across symbol periods. However, for multiple UEs 120 in a same cell and transmitting in a same symbol, the scrambling vector may be constant across the UEs 120. By performing inter-symbol period scrambling of the sets of time domain symbols with a cell-specific or symbol-specific scrambling code, UE 120*c* may mitigate some of the negative effects of the UE-specific spreading processes at 1010 and 1015, especially in the presence of oversampling in DFT spreading block 1030.

UE 120*c* may then perform a DFT spreading procedure on the sets of time domain symbols to determine frequency domain signals at 1030. This DFT procedure may be based on the size, M, of the sets of time domain symbols. However, to perform a frequency to time domain transform on these frequency domain signals, UE 120*c* may utilize an IFFT or inverse discrete Fourier Transform (IDFT). An IFFT or IDFT may take a set of frequency domain signals of length L as input, where L is a power of two, such that L=2^n for some integer value of n. However, M is based on the frequency resources for the UE data 1005, and may not be a power of two (e.g., a number of subcarriers allocated to the UE may not be power of 2). Accordingly, the output of the DFT spreading process at 1030 may not satisfy the input criteria for the IFFT process at 1040. To handle this discrepancy, UE 120*c* may perform zero padding of the frequency domain signals at 1035. For example, UE 120*c* may pad the M frequency domain signals with L-M zero values to obtain L frequency domain signals for the IFFT procedure.

However, to support padding the frequency values, UE 120*c* may additionally identify more samples than the M samples used for the DFT process. Identifying L samples (e.g., at 1030), but using M samples for the DFT process, may be referred to as oversampling or upsampling. By implementing oversampling or upsampling in the time domain, UE 120*c* may support the zero padding process in the frequency domain at 1035. This oversampling may result in PAPR degradation. However, due to the time domain scrambling at 1025, this PAPR degradation may be mitigated significantly.

At 1040, UE 120*c* may perform the IFFT process on the L frequency domain signals to generate a time domain waveform (e.g., a NOMA DFT-s-OFDM waveform) for uplink transmission. UE 120*c* may transmit this waveform to a base station 110 using the frequency and time resources identified for transmission of the UE data 1005.

As indicated above, FIG. 10 is provided merely as an example. Other examples may differ from what is described with regard to FIG. 10.

Figure 11:
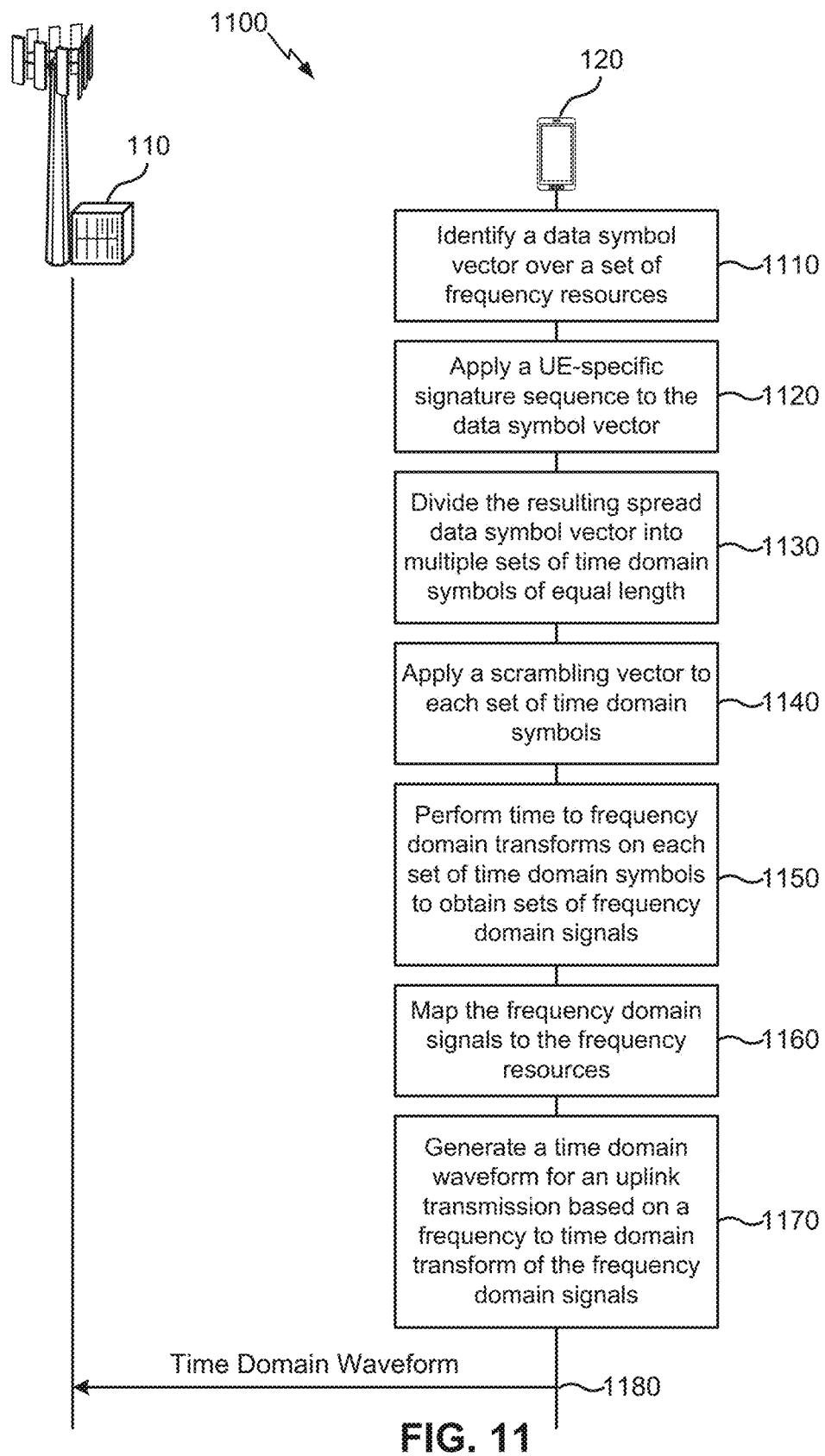
FIG. 11 illustrates an example of a process that supports PAPR reduction and inter-cell interference management in accordance with aspects of the present disclosure.

FIG. 11 illustrates an example of a process 1100 that supports PAPR reduction and inter-cell interference management in accordance with various aspects of the present disclosure. The process 1100 may include base station 110*c* and UE 120*d*, which may be examples of the corresponding devices as described with reference to FIGS. 1 through 10. UE 120*d* may generate a NOMA DFT-s-OFDM waveform for uplink transmission to base station 110*c*. To reduce the PAPR and the probability of inter-cell interference, UE 120*d* may implement inter-symbol period time domain scrambling when generating the DFT-s-OFDM waveform.

At 1105, UE 120*d* may identify a data symbol vector for an uplink transmission (e.g., a NOMA uplink transmission utilizing a DFT-s-OFDM waveform). UE 120*d* may determine a set of frequency resources and one or more symbol periods—or other length TTIs or shortened TTIs (sTTIs)—for this uplink transmission.

At 1110, UE 120*d* may apply a UE-specific signature sequence to the data symbol vector in a time domain to obtain a spread data symbol vector. UE 120*d* may apply the UE-specific signature sequence to a single layer or multiple superimposed or otherwise combined layers (e.g., associated with different data streams). In some cases (e.g., in a single stage spreading process), UE 120*d* may apply a single spreading sequence. In other cases (e.g., in a hybrid spreading process), UE 120*d* may apply both a spreading sequence and a scrambling sequence to the data symbol vector (e.g., in turn). The spreading sequence may be shorter in length than the scrambling sequence. The UE-specific signature sequence at 1110 may be applied at a code block or transport block level to the data symbol vector. The UE-specific signature sequence may have a length that is shorter or longer than a number of frequency resources allocated to the UE for transmission of the code block or transport block, and thus the spreading and/or scrambling applied may be applied to data symbols of the data symbol vector spanning multiple symbol periods after serial-to-parallel conversion.

At 1115, UE 120*d* may divide the resulting spread data symbol vector into multiple sets of time domain symbols. Each of these sets of time domain symbols may be an equal length, and may additionally be equal to a number of frequency resources of the determined set of frequency resources for the uplink transmission. This number of frequency resources (e.g., M) may correspond to, for example, an allocated or identified set of subcarriers or resource blocks for a grant-based or grant-free transmission.

At 1120, UE 120*d* may apply a scrambling vector to each of the sets of time domain symbols. This scrambling vector may be an example of a cell-specific scrambling code, a symbol-specific scrambling code, or a combination of the two. The scrambling vector may be determined based on one or more CAZAC sequences, complementary Golay sequences, nonlinear frequency modulated chirp sequences, or some combination of these or other similar biphase or polyphase sequences. Additionally or alternatively, the scrambling vector may be based on the cell identifier, a symbol index, or the length of the sets of time domain symbols and, correspondingly, the length of the scrambling vector, M.

At 1125, UE 120*d* may perform respective time to frequency domain transforms on the sets of time domain symbols to obtain a set of frequency domain signals. This transform may be an example of a DFT. In some cases, UE 120*d* may additionally perform oversampling or upsampling in the time domain to handle a difference in the length of the set of frequency domain signals, and a length of a frequency to time domain transform to perform. At 1130, UE 120*d* may map the set of frequency domain signals to the set of frequency resources for the uplink transmission. In some cases, this mapping may involve zero padding in the frequency domain, which may be supported by the oversampling or upsampling in the time domain.

At 1135, UE 120*d* may generate a time domain waveform for the uplink transmission based on applying the frequency to time domain transform to the set of frequency domain signals mapped to the frequency resources. This transform may be an example of an IFFT or IDFT, and the generated waveform may be an example of a NOMA DFT-s-OFDM waveform. At 1140, UE 120*d* may transmit the NOMA DFT-s-OFDM waveform to a receiver (e.g., at a base station 110) using the frequency and time resources for the uplink transmission.

As indicated above, FIG. 11 is provided merely as an example. Other examples may differ from what is described with regard to FIG. 11.

Figure 12:
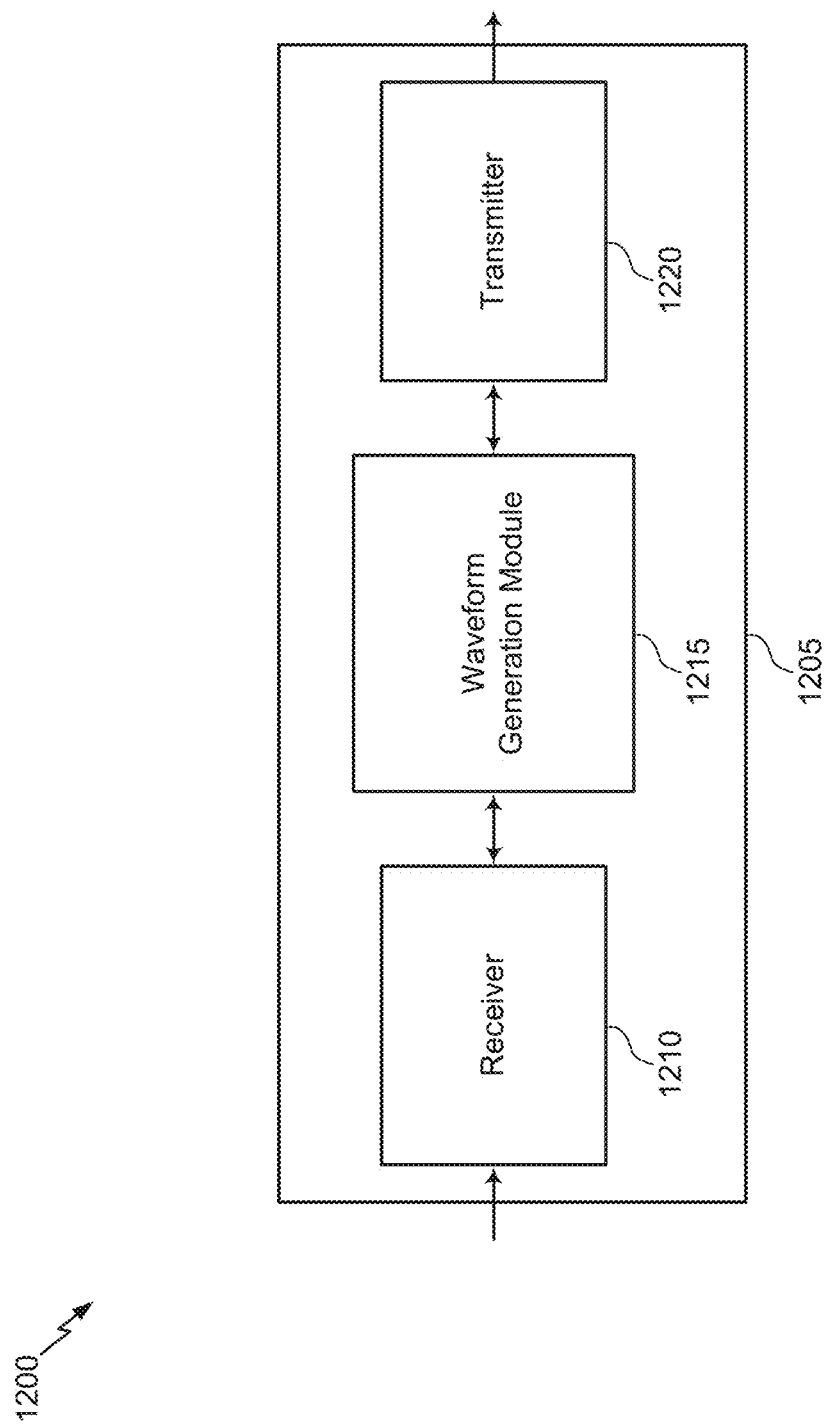
FIGS. 12 through 14 show block diagrams of a device that supports PAPR reduction and inter-cell interference management in accordance with aspects of the present disclosure.

FIG. 12 shows a block diagram 1200 of a wireless communication device 1205 that supports PAPR reduction and inter-cell interference management in accordance with aspects of the present disclosure. Wireless communication device 1205 may be an example of aspects of a UE 120 as described herein. Wireless communication device 1205 may include receiver 1210, waveform generation module 1215, and transmitter 1220. Wireless communication device 1205 may also include a processor. Each of these components may be in communication with one another (e.g., via one or more buses).

Receiver 1210 may receive information such as packets, user data, or control information associated with various information channels (e.g., control channels, data channels, and information related to PAPR reduction and inter-cell interference management, etc.). Information may be passed on to other components of the device. The receiver 1210 may be an example of aspects of the transceiver 1535 described with reference to FIG. 15, below. The receiver 1210 may utilize a single antenna or a set of antennas.

Waveform generation module 1215 may be an example of aspects of the waveform generation module 1315, 1415, or 1515 described with reference to FIGS. 13 through 15. Waveform generation module 1215 and/or at least some of its various sub-components may be implemented in hardware, software executed by a processor, firmware, or any combination thereof. If implemented in software executed by a processor, the functions of the waveform generation module 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The waveform generation module 1215 and/or at least some of its various sub-components may be physically located at various positions, including being distributed such that portions of functions are implemented at different physical locations by one or more physical devices. In some examples, waveform generation module 1215 and/or at least some of its various sub-components may be a separate and distinct component in accordance with various aspects of the present disclosure. In other examples, waveform generation module 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Waveform generation module 1215 may identify a data symbol vector for an uplink transmission over a set of frequency resources in one or more symbol periods, apply a UE-specific signature sequence to the data symbol vector in a time domain to obtain a spread data symbol vector, and divide the spread data symbol vector into multiple sets of time domain symbols, where each of the sets of time domain symbols has a length equal to a first number of frequency resources of the set of frequency resources. Waveform generation module 1215 may apply a scrambling vector to each of the sets of time domain symbols, and perform respective time to frequency domain transforms on the multiple sets of time domain symbols to obtain a set of frequency domain signals. Waveform generation module 1215 may map the set of frequency domain signals to the set of frequency resources, generate a time domain waveform for the uplink transmission based on a frequency to time domain transform of the set of frequency domain signals mapped to the set of frequency resources, and transmit the time domain waveform to a receiver.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

As indicated above, FIG. 12 is provided merely as an example. Other examples may differ from what is described with regard to FIG. 12.

Figure 13:
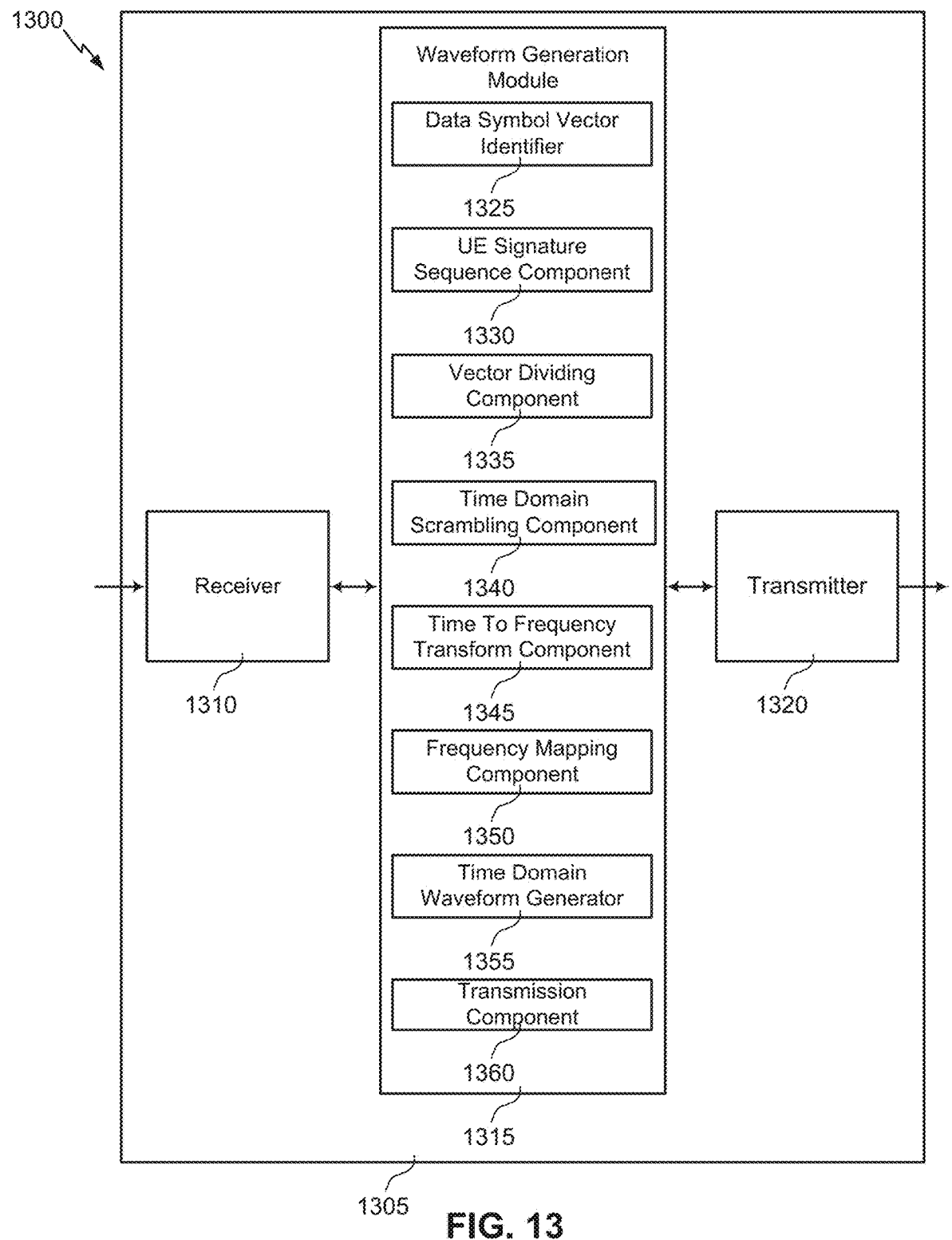

FIG. 13 shows a block diagram 1300 of a wireless communication device 1305 that supports PAPR reduction and inter-cell interference management in accordance with aspects of the present disclosure. Wireless communication device 1305 may be an example of aspects of a wireless communication device 1205 or a UE 120 as described with reference to FIGS. 1 through 12. Wireless communication device 1305 may include receiver 1310, waveform generation module 1315, and transmitter 1320. Wireless communication device 1305 may also include a processor. Each of these components may be in communication with one another (e.g., via one or more buses).

Receiver 1310 may receive information such as packets, user data, or control information associated with various information channels (e.g., control channels, data channels, and information related to PAPR reduction and inter-cell interference management, etc.). Information may be passed on to other components of the device. The receiver 1310 may be an example of aspects of the transceiver 1535 described with reference to FIG. 15. The receiver 1310 may utilize a single antenna or a set of antennas.

Waveform generation module 1315 may be an example of aspects of the waveform generation module 1215, 1415, or 1515 described with reference to FIGS. 12, 14, and 15. Waveform generation module 1315 may also include data symbol vector identifier 1325, UE signature sequence component 1330, vector dividing component 1335, time domain scrambling component 1340, time to frequency transform component 1345, frequency mapping component 1350, time domain waveform generator 1355, and transmission component 1360.

Data symbol vector identifier 1325 may identify a data symbol vector for an uplink transmission over a set of frequency resources in one or more symbol periods. In some cases, the data symbol vector corresponds to multiple data streams. UE signature sequence component 1330 may apply a UE-specific signature sequence to the data symbol vector in a time domain to obtain a spread data symbol vector. In some cases, the UE-specific signature sequence is selected from a set of non-orthogonal UE-specific signature sequences. Vector dividing component 1335 may divide the spread data symbol vector into multiple sets of time domain symbols, where each set of the multiple sets of time domain symbols has a length equal to a first number of frequency resources of the set of frequency resources.

Time domain scrambling component 1340 may apply a scrambling vector to each of the multiple sets of time domain symbols. Time to frequency transform component 1345 may perform respective time to frequency domain transforms on the multiple sets of time domain symbols to obtain a set of frequency domain signals. Frequency mapping component 1350 may map the set of frequency domain signals to the set of frequency resources. In some cases, the mapping includes zero padding the set of frequency domain signals for input to the frequency to time domain transform.

Time domain waveform generator 1355 may generate a time domain waveform for the uplink transmission based on a frequency to time domain transform of the set of frequency domain signals mapped to the set of frequency resources. Transmission component 1360 may transmit the time domain waveform to a receiver.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

As indicated above, FIG. 13 is provided merely as an example. Other examples may differ from what is described with regard to FIG. 13.

Figure 14:
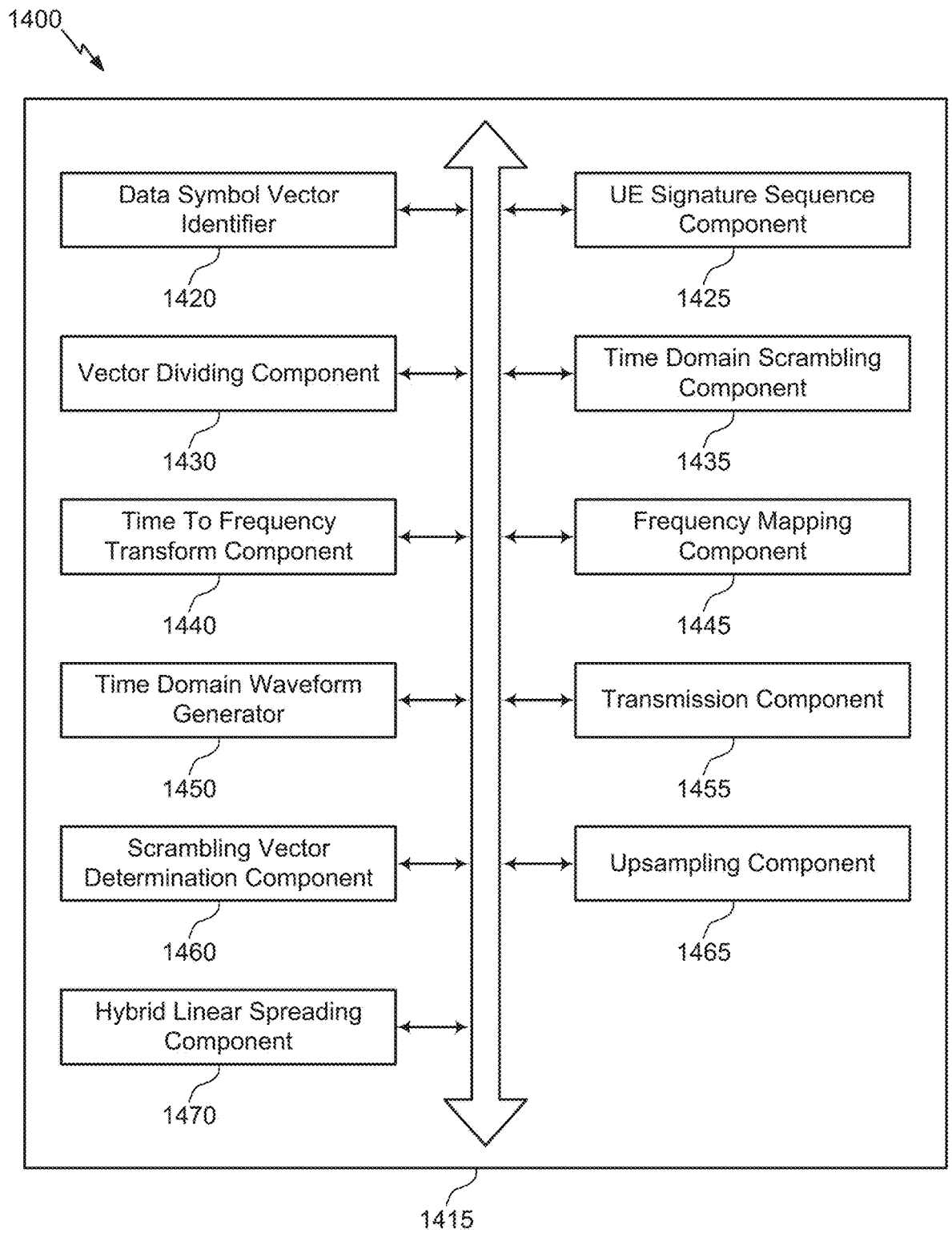

FIG. 14 shows a block diagram 1400 of a waveform generation module 1415 that supports PAPR reduction and inter-cell interference management in accordance with aspects of the present disclosure. The waveform generation module 1415 may be an example of aspects of a waveform generation module 1215, 1315, or 1515 described with reference to FIGS. 12, 13, and 15. The waveform generation module 1415 may include data symbol vector identifier 1420, UE signature sequence component 1425, vector dividing component 1430, time domain scrambling component 1435, time to frequency transform component 1440, frequency mapping component 1445, time domain waveform generator 1450, transmission component 1455, scrambling vector determination component 1460, upsampling component 1465, and hybrid linear spreading component 1470.

Each of these modules may communicate, directly or indirectly, with one another (e.g., via one or more buses).

Data symbol vector identifier 1420 may identify a data symbol vector for an uplink transmission over a set of frequency resources in one or more symbol periods. In some cases, the data symbol vector corresponds to multiple data streams.

UE signature sequence component 1425 may apply a UE-specific signature sequence to the data symbol vector in a time domain to obtain a spread data symbol vector. In some cases, the UE-specific signature sequence is selected from a set of non-orthogonal UE-specific signature sequences.

Vector dividing component 1430 may divide the spread data symbol vector into multiple sets of time domain symbols, where each set of the multiple sets of time domain symbols has a length equal to a first number of frequency resources of the set of frequency resources.

Time domain scrambling component 1435 may apply a scrambling vector to each of the multiple sets of time domain symbols. In some cases, the scrambling vector includes a CAZAC sequence having a length equal to the first number of frequency resources and having a prime root index. In some cases, the scrambling vector includes a first CAZAC sequence having a first root index and a first cyclic shift and a second CAZAC sequence having a second root index and a second cyclic shift, where at least one of the first root index or the first cyclic shift is different than the second root index or the second cyclic shift, respectively. In some cases, the scrambling vector includes one of a set of complementary Golay sequences. In some cases, the scrambling vector includes a non-linear frequency modulated chirp sequence.

Time to frequency transform component 1440 may perform respective time to frequency domain transforms on the multiple sets of time domain symbols to obtain a set of frequency domain signals.

Frequency mapping component 1445 may map the set of frequency domain signals to the set of frequency resources. In some cases, the mapping includes zero padding the set of frequency domain signals for input to the frequency to time domain transform.

Time domain waveform generator 1450 may generate a time domain waveform for the uplink transmission based on a frequency to time domain transform of the set of frequency domain signals mapped to the set of frequency resources.

Transmission component 1455 may transmit the time domain waveform to a receiver.

Scrambling vector determination component 1460 may determine the scrambling vector based on a cell identifier of a serving cell and the first number of frequency resources. Additionally, or alternatively, scrambling vector determination component 1460 may determine the scrambling vector for the multiple sets of time domain symbols based on respective symbol indices associated with transmission of the multiple sets of time domain symbols.

In some cases, performing the respective time to frequency domain transforms may include upsampling component 1465 upsampling the multiple sets of time domain symbols, the upsampling being based on a difference between the first number of frequency resources and a length of the frequency to time domain transform.

In some cases, applying the UE-specific signature sequence may include hybrid linear spreading component 1470 spreading the data symbol vector with a spreading sequence of a first length to obtain an intermediate spread data symbol vector and scrambling the intermediate spread data symbol vector by the UE-specific signature sequence, where the UE-specific signature sequence has a second length that is greater than the first length.

As indicated above, FIG. 14 is provided merely as an example. Other examples may differ from what is described with regard to FIG. 14.

Figure 15:
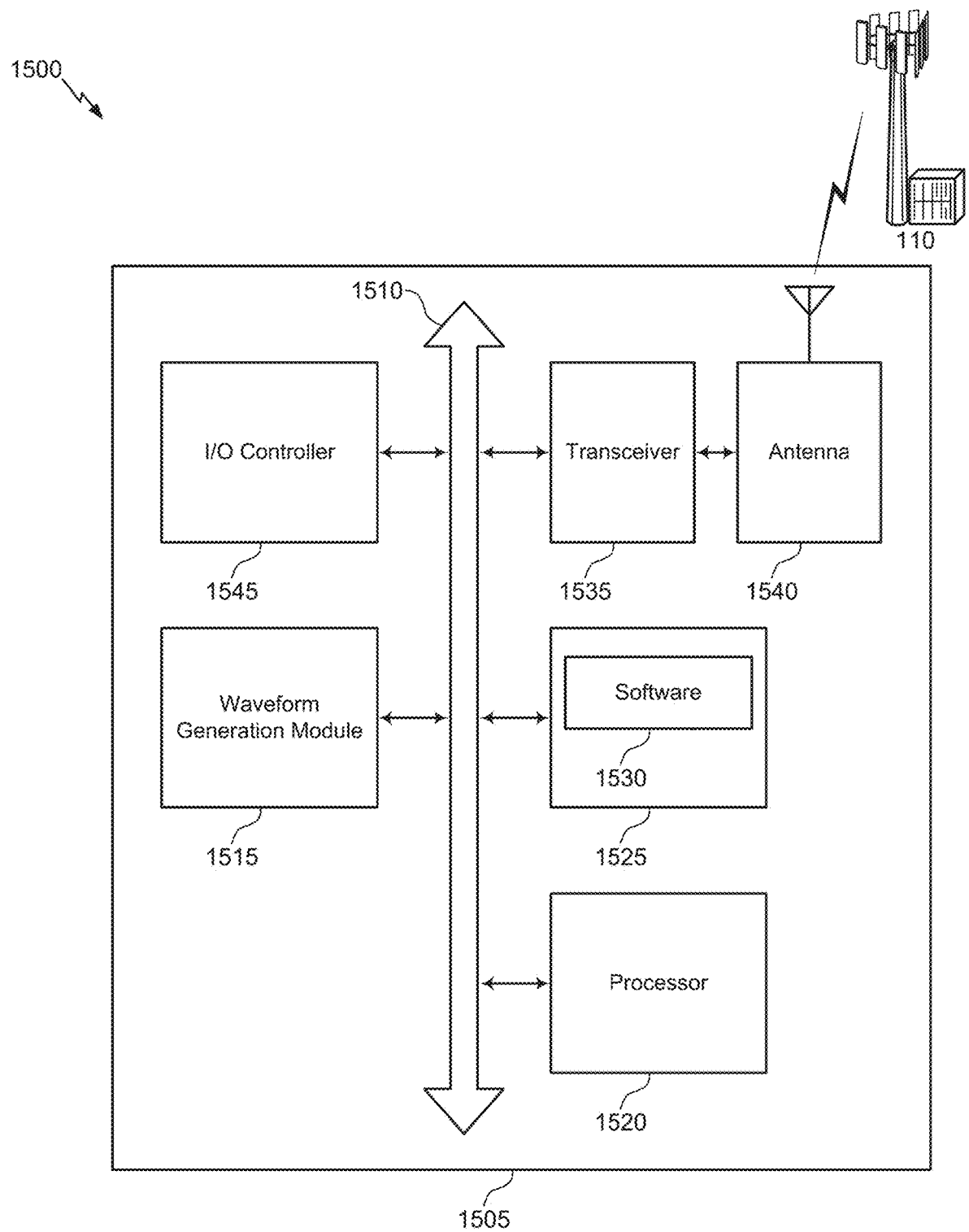
FIG. 15 illustrates a block diagram of a system including a UE that supports PAPR reduction and inter-cell interference management in accordance with aspects of the present disclosure.

FIG. 15 shows a diagram of a system 1500 including a device 1505 that supports PAPR reduction and inter-cell interference management in accordance with aspects of the present disclosure. Device 1505 may be an example of or include the components of wireless communication device 1205, wireless communication device 1305, or a UE 120 as described above, e.g., with reference to FIGS. 1 through 13. Device 1505 may include components for bi-directional voice and data communications including components for transmitting and receiving communications, including waveform generation module 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 110.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting PAPR reduction and inter-cell interference management).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support PAPR reduction and inter-cell interference management. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

As indicated above, FIG. 15 is provided merely as an example. Other examples may differ from what is described with regard to FIG. 15.

FIG. 16 shows a flowchart illustrating a process 1600 for PAPR reduction and inter-cell interference management in accordance with aspects of the present disclosure. In some aspects, "method" may be used interchangeably with "process". The operations of process 1600 may be implemented by a UE 120 or its components as described herein. For example, the operations of process 1600 may be performed by a waveform generation module as described with reference to FIGS. 12 through 15. In some examples, a UE 120 may execute a set of codes to control the functional elements of the device to perform the functions described below. Additionally or alternatively, the UE 120 may perform aspects of the functions described below using special-purpose hardware.

At 1605 the UE 120 may identify a data symbol vector for an uplink transmission over a set of frequency resources in one or more symbol periods. The operations of 1605 may be performed according to the methods described herein. In certain examples, aspects of the operations of 1605 may be performed by a data symbol vector identifier as described with reference to FIGS. 12 through 15.

At 1610 the UE 120 may apply a UE-specific signature sequence to the data symbol vector in a time domain to obtain a spread data symbol vector. The operations of 1610 may be performed according to the methods described herein. In certain examples, aspects of the operations of 1610 may be performed by a UE signature sequence component as described with reference to FIGS. 12 through 15.

At 1615 the UE 120 may divide the spread data symbol vector into a plurality of sets of time domain symbols, wherein each set of the plurality of sets of time domain symbols has a length equal to a first number of frequency resources of the set of frequency resources. The operations of 1615 may be performed according to the methods described herein. In certain examples, aspects of the operations of 1615 may be performed by a vector dividing component as described with reference to FIGS. 12 through 15.

At 1620 the UE 120 may apply a scrambling vector to each of the plurality of sets of time domain symbols. The operations of 1620 may be performed according to the methods described herein. In certain examples, aspects of the operations of 1620 may be performed by a time domain scrambling component as described with reference to FIGS. 12 through 15.

At 1625 the UE 120 may perform respective time to frequency domain transforms on the plurality of sets of time domain symbols to obtain a plurality of frequency domain signals. The operations of 1625 may be performed according to the methods described herein. In certain examples, aspects of the operations of 1625 may be performed by a time to frequency transform component as described with reference to FIGS. 12 through 15.

At 1630 the UE 120 may map the plurality of frequency domain signals to the set of frequency resources. The operations of 1630 may be performed according to the methods described herein. In certain examples, aspects of the operations of 1630 may be performed by a frequency mapping component as described with reference to FIGS. 12 through 15.

At 1635 the UE 120 may generate a time domain waveform for the uplink transmission based on a frequency to time domain transform of the plurality of frequency domain signals mapped to the set of frequency resources. The operations of 1635 may be performed according to the methods described herein. In certain examples, aspects of the operations of 1635 may be performed by a time domain waveform generator as described with reference to FIGS. 12 through 15.

At 1640 the UE 120 may transmit the time domain waveform to a receiver. The operations of 1640 may be performed according to the methods described herein. In certain examples, aspects of the operations of 1640 may be performed by a transmission component as described with reference to FIGS. 12 through 15.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 shows a flowchart illustrating a process 1700 for PAPR reduction and inter-cell interference management in accordance with aspects of the present disclosure. The operations of process 1700 may be implemented by a UE 120 or its components as described herein. For example, the operations of process 1700 may be performed by a waveform generation module as described with reference to FIGS. 12 through 15. In some examples, a UE 120 may execute a set of codes to control the functional elements of the device to perform the functions described below. Additionally or alternatively, the UE 120 may perform aspects of the functions described below using special-purpose hardware.

At 1705 the UE 120 may identify a data symbol vector for an uplink transmission over a set of frequency resources in one or more symbol periods. The operations of 1705 may be performed according to the methods described herein. In certain examples, aspects of the operations of 1705 may be performed by a data symbol vector identifier as described with reference to FIGS. 12 through 15.

At 1710 the UE 120 may apply a UE-specific signature sequence to the data symbol vector in a time domain to obtain a spread data symbol vector. The operations of 1710 may be performed according to the methods described herein. In certain examples, aspects of the operations of 1710 may be performed by a UE signature sequence component as described with reference to FIGS. 12 through 15.

At 1715 the UE 120 may divide the spread data symbol vector into a plurality of sets of time domain symbols, wherein each set of the plurality of sets of time domain symbols has a length equal to a first number of frequency resources of the set of frequency resources. The operations of 1715 may be performed according to the methods described herein. In certain examples, aspects of the operations of 1715 may be performed by a vector dividing component as described with reference to FIGS. 12 through 15.

At 1720 the UE 120 may apply a scrambling vector to each of the plurality of sets of time domain symbols. The operations of 1720 may be performed according to the methods described herein. In certain examples, aspects of the operations of 1720 may be performed by a time domain scrambling component as described with reference to FIGS. 12 through 15.

At 1725 the UE 120 may upsample the plurality of sets of time domain symbols, the upsampling being based on a difference between the first number of frequency resources and a length of the frequency to time domain transform. The operations of 1725 may be performed according to the methods described herein. In certain examples, aspects of the operations of 1725 may be performed by an upsampling component as described with reference to FIGS. 12 through 15.

At 1730 the UE 120 may perform respective time to frequency domain transforms on the plurality of sets of time domain symbols to obtain a plurality of frequency domain signals. The operations of 1730 may be performed according to the methods described herein. In certain examples, aspects of the operations of 1730 may be performed by a time to frequency transform component as described with reference to FIGS. 12 through 15.

At 1735 the UE 120 may map the plurality of frequency domain signals to the set of frequency resources. The operations of 1735 may be performed according to the methods described herein. In certain examples, aspects of the operations of 1735 may be performed by a frequency mapping component as described with reference to FIGS. 12 through 15.

At 1740 the UE 120 may generate a time domain waveform for the uplink transmission based on a frequency to time domain transform of the plurality of frequency domain signals mapped to the set of frequency resources. The operations of 1740 may be performed according to the methods described herein. In certain examples, aspects of the operations of 1740 may be performed by a time domain waveform generator as described with reference to FIGS. 12 through 15.

At 1745 the UE 120 may transmit the time domain waveform to a receiver. The operations of 1745 may be performed according to the methods described herein. In certain examples, aspects of the operations of 1745 may be performed by a transmission component as described with reference to FIGS. 12 through 15.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 shows a flowchart illustrating a process 1800 for PAPR reduction and inter-cell interference management in accordance with aspects of the present disclosure. The operations of process 1800 may be implemented by a UE 120 or its components as described herein. For example, the operations of process 1800 may be performed by a waveform generation module as described with reference to FIGS. 12 through 15. In some examples, a UE 120 may execute a set of codes to control the functional elements of the device to perform the functions described below. Additionally or alternatively, the UE 120 may perform aspects of the functions described below using special-purpose hardware.

At 1805 the UE 120 may identify a data symbol vector for an uplink transmission over a set of frequency resources in one or more symbol periods. The operations of 1805 may be performed according to the methods described herein. In certain examples, aspects of the operations of 1805 may be performed by a data symbol vector identifier as described with reference to FIGS. 12 through 15.

The UE 120 may apply a UE-specific signature sequence to the data symbol vector in a time domain to obtain a spread data symbol vector. For example, at 1810 the UE 120 may spread the data symbol vector with a spreading sequence of a first length to obtain an intermediate spread data symbol vector. The operations of 1810 may be performed according to the methods described herein. In certain examples, aspects of the operations of 1810 may be performed by a hybrid linear spreading component as described with reference to FIGS. 12 through 15.

At 1815 the UE 120 may scramble the intermediate spread data symbol vector by the UE-specific signature sequence, wherein the UE-specific signature sequence has a second length that is greater than the first length. The operations of 1815 may be performed according to the methods described herein. In certain examples, aspects of the operations of 1815 may be performed by a hybrid linear spreading component as described with reference to FIGS. 12 through 15.

At 1820 the UE 120 may divide the spread data symbol vector into a plurality of sets of time domain symbols, wherein each set of the plurality of sets of time domain symbols has a length equal to a first number of frequency resources of the set of frequency resources. The operations of 1820 may be performed according to the methods described herein. In certain examples, aspects of the operations of 1820 may be performed by a vector dividing component as described with reference to FIGS. 12 through 15.

At 1825 the UE 120 may apply a scrambling vector to each of the plurality of sets of time domain symbols. The operations of 1825 may be performed according to the methods described herein. In certain examples, aspects of the operations of 1825 may be performed by a time domain scrambling component as described with reference to FIGS. 12 through 15.

At 1830 the UE 120 may perform respective time to frequency domain transforms on the plurality of sets of time domain symbols to obtain a plurality of frequency domain signals. The operations of 1830 may be performed according to the methods described herein. In certain examples, aspects of the operations of 1830 may be performed by a time to frequency transform component as described with reference to FIGS. 12 through 15.

At 1835 the UE 120 may map the plurality of frequency domain signals to the set of frequency resources. The operations of 1835 may be performed according to the methods described herein. In certain examples, aspects of the operations of 1835 may be performed by a frequency mapping component as described with reference to FIGS. 12 through 15.

At 1840 the UE 120 may generate a time domain waveform for the uplink transmission based on a frequency to time domain transform of the plurality of frequency domain signals mapped to the set of frequency resources. The operations of 1840 may be performed according to the methods described herein. In certain examples, aspects of the operations of 1840 may be performed by a time domain waveform generator as described with reference to FIGS. 12 through 15.

At 1845 the UE 120 may transmit the time domain waveform to a receiver. The operations of 1845 may be performed according to the methods described herein. In certain examples, aspects of the operations of 1845 may be performed by a transmission component as described with reference to FIGS. 12 through 15.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

FIG. 19 is a diagram illustrating an example process 1900 performed, for example, by a wireless communication device, in accordance with various aspects of the present disclosure. Example process 1900 is an example where a wireless communication device (e.g., BS 110 or UE 120) performs a joint spreading and scrambling process for PAPR or inter-cell interference (ICI) reduction.

As shown in FIG. 19, in some aspects, process 1900 may include applying one or more spreading sequences to a set of modulation symbols of a data set to generate spread modulation symbols (block 1910). For example, the wireless communication device (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may apply one or more spreading sequences to a set of modulation symbols of a data set to generate spread modulation symbols. As used herein, a modulation symbol may refer to a time domain data symbol (e.g., with linear modulation), a spread time domain data symbol, a frequency domain data symbol, and/or the like.

As shown in FIG. 19, in some aspects, process 1900 may include applying a scrambling sequence to the spread modulation symbols to generate a set of scrambled symbols (block 1920). For example, the wireless communication device (e.g., using controller/processor 280, transmit processor 264, TeX MIMO processor 266, MOD 254, antenna 252, controller/processor 240, transmit processor 220, TX MIMO processor 230, MOD 232, antenna 234, and/or the like) may apply a scrambling sequence to the spread modulation symbols to generate a set of scrambled symbols. As used herein, a scrambling sequence may refer to a recoding sequence, a mask sequence, and/or the like.

In some aspects, the spreading sequence and the scrambling sequence may be jointly designed. For example, the spreading sequence may be based at least in part on the scrambling sequence or vice versa. As another example, a codebook of spreading sequences may be conditioned using (e.g., multiplied by) a cell-specific mask sequence. A jointly-designed spreading sequence and scrambling sequence may be referred to herein as a two-stage spreading technique, a hybrid linear spreading technique, and/or the like.

In some aspects, the spreading codes and the precoding/scrambling/mask sequences may be jointly designed to achieve a desired spectral efficiency (e.g., using a spreading factor), a desired overloading ratio (e.g., by selecting the codebook size of the spreading sequence), scalability and flexibility (e.g., by identifying the type of spreading codes of the spreading sequence), PAPR reduction (e.g., using the precoding/scrambling/mask sequence design), and/or inter-cell interference mitigation (e.g., by making the scrambling/precoding sequences cell-specific, applying hopping of the spreading sequences, making the hopping pattern cell-specific, and/or the hybrid use of hopping and scrambling), as described in more detail elsewhere herein.

As shown in FIG. 19, in some aspects, process 1900 may include transmitting a waveform based at least in part on the set of scrambled symbols (block 1930). For example, the wireless communication device (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit a waveform based at least in part on the set of scrambled symbols. In some aspects, the wireless communication device may perform one or more of the operations described herein in connection with processes 500, 800, 1600, 1700, and/or 1800 to generate and/or transmit the waveform. In some aspects, the waveform may be associated with an uplink communication or a downlink communication.

Process 1900 may include additional aspects, such as any single aspect and/or any combination of aspects described below and/or in connection with one or more other processes described elsewhere herein.

In some aspects, the scrambling sequence is based at least in part on the one or more spreading sequences. In some aspects, the one or more spreading sequences are applied using a hopping technique. In some aspects, the one or more spreading sequences are linear spreading sequences. In some aspects, the one or more spreading sequences are based at least in part on at least one of a Zadoff-Chu sequence, a Gold sequence, or an orthogonal cover code. In some aspects, the waveform is a cyclic prefix orthogonal frequency division multiplexing waveform, and the one or more spreading sequences are applied in a frequency domain.

In some aspects, the waveform is a discrete Fourier transform-spread-orthogonal frequency division multiplexing waveform and the one or more spreading sequences are applied in a time domain. In some aspects, the data set is associated with a data transmission. In some aspects, the data set is associated with a control transmission. In some aspects, the data set is associated with at least one of a demodulation reference signal, a positioning reference signal, or a sounding reference signal.

In some aspects, the waveform is associated with a multi-user multiple-input multiple-output communication. In some aspects, at least one of the one or more spreading sequences or the scrambling sequence is configured to reduce a peak-to-average power ratio of the waveform. In some aspects, at least one of the one or more spreading sequences or the scrambling sequence is configured to reduce a peak-to-average power ratio and inter-cell interference of the waveform. In some aspects, at least one of the one or more spreading sequences or the scrambling sequence is configured to reduce inter-cell interference of the waveform. In some aspects, the one or more spreading sequences are applied using a cell-specific hopping pattern. In some aspects, the one or more spreading sequences are generated based at least in part on subset partitioning of a spreading codebook. In some aspects, the scrambling sequence is applied using at least one of cell-specific scrambling or symbol-level scrambling. In some aspects, at least one of the one or more spreading sequences or the scrambling sequence is configured to reduce inter-cell interference of the waveform.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
    applying one or more spreading sequences to a set of modulation symbols of a data set to generate spread modulation symbols, wherein applying the one or more spreading sequences comprises performing spreading based at least in part on multiplying a codeword by a cell-specific mask sequence;
    applying a scrambling sequence to the spread modulation symbols to generate a set of scrambled symbols, wherein a spreading sequence, of the one or more spreading sequences, is shorter in length than the scrambling sequence; and transmitting a waveform based at least in part on the set of scrambled symbols.

2. The method of claim 1, wherein the scrambling sequence is based at least in part on the one or more spreading sequences.

3. The method of claim 1, wherein the one or more spreading sequences are applied using a hopping technique.

4. The method of claim 1, wherein the one or more spreading sequences are linear spreading sequences.

5. The method of claim 1, wherein the one or more spreading sequences are based at least in part on at least one of a Zadoff-Chu sequence, a Gold sequence, or an orthogonal cover code.

6. The method of claim 1, wherein the waveform is a cyclic prefix orthogonal frequency division multiplexing waveform, and wherein the one or more spreading sequences are applied in a frequency domain.

7. The method of claim 1, wherein the waveform is a discrete Fourier transform-spread-orthogonal frequency division multiplexing waveform and wherein the one or more spreading sequences are applied in a time domain.

8. The method of claim 1, wherein the data set is associated with a data transmission.

9. The method of claim 1, wherein the data set is associated with a control transmission.

10. The method of claim 1, wherein the data set is associated with at least one of:
a demodulation reference signal,
a positioning reference signal, or
a sounding reference signal.

11. The method of claim 1, wherein the waveform is associated with a multi-user multiple-input multiple-output communication.

12. The method of claim 1, wherein at least one of the one or more spreading sequences or the scrambling sequence is configured to reduce a peak-to-average power ratio of the waveform.

13. The method of claim 1, wherein at least one of the one or more spreading sequences or the scrambling sequence is configured to reduce a peak-to-average power ratio and inter-cell interference of the waveform.

14. The method of claim 1, wherein at least one of the one or more spreading sequences or the scrambling sequence is configured to reduce inter-cell interference of the waveform.

15. The method of claim 14, wherein the one or more spreading sequences are applied using a cell-specific hopping pattern.

16. The method of claim 14, wherein the one or more spreading sequences are generated based at least in part on subset partitioning of a spreading codebook.

17. The method of claim 14, wherein the scrambling sequence is applied using at least one of cell-specific scrambling or symbol-level scrambling.

18. The method of claim 1, wherein the scrambling sequence is configured to reduce inter-cell interference of the waveform.

19. A wireless communication device for wireless communication, comprising:
a memory; and
one or more processors configured to:
apply one or more spreading sequences to a set of modulation symbols of a data set to generate spread modulation symbols, wherein, when applying the one or more spreading sequences, the one or more processors are configured to perform spreading based at least in part on multiplying a codeword by a cell-specific mask sequence;

apply a scrambling sequence to the spread modulation symbols to generate a set of scrambled symbols, wherein a spreading sequence, of the one or more spreading sequences, is shorter in length than the scrambling sequence; and
transmit a waveform based at least in part on the set of scrambled symbols.

20. The wireless communication device of claim 19, wherein the scrambling sequence is based at least in part on the one or more spreading sequences.

21. The wireless communication device of claim 19, wherein the one or more spreading sequences are applied using a hopping technique.

22. The wireless communication device of claim 19, wherein the one or more spreading sequences are linear spreading sequences.

23. The wireless communication device of claim 19, wherein the one or more spreading sequences are based at least in part on at least one of a Zadoff-Chu sequence, a Gold sequence, or an orthogonal cover code.

24. The wireless communication device of claim 19, wherein the waveform is a cyclic prefix orthogonal frequency division multiplexing waveform, and wherein the one or more spreading sequences are applied in a frequency domain.

25. The wireless communication device of claim 19, wherein the waveform is a discrete Fourier transform-spread-orthogonal frequency division multiplexing waveform and wherein the one or more spreading sequences are applied in a time domain.

26. The wireless communication device of claim 19, wherein the data set is associated with a data transmission.

27. The wireless communication device of claim 19, wherein the data set is associated with a control transmission.

28. The wireless communication device of claim 19, wherein the data set is associated with at least one of:
a demodulation reference signal,
a positioning reference signal, or
a sounding reference signal.

29. The wireless communication device of claim 19, wherein the waveform is associated with a multi-user multiple-input multiple-output communication.

30. The wireless communication device of claim 19, wherein at least one of the one or more spreading sequences or the scrambling sequence is configured to reduce a peak-to-average power ratio of the waveform.

31. The wireless communication device of claim 19, wherein at least one of the one or more spreading sequences or the scrambling sequence is configured to reduce a peak-to-average power ratio and inter-cell interference of the waveform.

32. The wireless communication device of claim 19, wherein at least one of the one or more spreading sequences or the scrambling sequence is configured to reduce inter-cell interference of the waveform.

33. The wireless communication device of claim 32, wherein the one or more spreading sequences are applied using a cell-specific hopping pattern.

34. The wireless communication device of claim 32, wherein the one or more spreading sequences are generated based at least in part on subset partitioning of a spreading codebook.

35. The wireless communication device of claim 32, wherein the scrambling sequence is applied using at least one of cell-specific scrambling or symbol-level scrambling.

36. The wireless communication device of claim 19, wherein the scrambling sequence is configured to reduce inter-cell interference of the waveform.

37. A non-transitory computer-readable medium storing one or more instructions for wireless communication, the one or more instructions comprising:
one or more instructions that, when executed by one or more processors of a wireless communication device, cause the one or more processors to:
apply one or more spreading sequences to a set of modulation symbols of a data set to generate spread modulation symbols, wherein the one or more instructions, that cause the one or more processors to apply the one or more spreading sequences, cause the one or more processors to perform spreading based at least in part on multiplying a codeword by a cell-specific mask sequence;
apply a scrambling sequence to the spread modulation symbols to generate a set of scrambled symbols, wherein a spreading sequence, of the one or more spreading sequences, is shorter in length than the scrambling sequence; and
transmit a waveform based at least in part on the set of scrambled symbols.

38. An apparatus for wireless communication, comprising:
means for applying one or more spreading sequences to a set of modulation symbols of a data set to generate spread modulation symbols, wherein the means for applying the one or more spreading sequences comprises means for performing spreading based at least in part on multiplying a codeword by a cell-specific mask sequence;
means for applying a scrambling sequence to the spread modulation symbols to generate a set of scrambled symbols, wherein a spreading sequence, of the one or more spreading sequences, is shorter in length than the scrambling sequence; and
means for transmitting a waveform based at least in part on the set of scrambled symbols.

39. The apparatus of claim 38, wherein the scrambling sequence is based at least in part on the one or more spreading sequences.

40. The apparatus of claim 38, wherein the one or more spreading sequences are applied using a hopping technique.

41. The apparatus of claim 38, wherein the one or more spreading sequences are linear spreading sequences.

42. The apparatus of claim 38, wherein the one or more spreading sequences are based at least in part on at least one of a Zadoff-Chu sequence, a Gold sequence, or an orthogonal cover code.

43. The apparatus of claim 38, wherein the waveform is a cyclic prefix orthogonal frequency division multiplexing waveform, and wherein the one or more spreading sequences are applied in a frequency domain.

44. The apparatus of claim 38, wherein the waveform is a discrete Fourier transform-spread-orthogonal frequency division multiplexing waveform and wherein the one or more spreading sequences are applied in a time domain.

45. The apparatus of claim 38, wherein the data set is associated with a data transmission.

46. The apparatus of claim 38, wherein the data set is associated with a control transmission.

47. The apparatus of claim 38, wherein the data set is associated with at least one of:
a demodulation reference signal,
a positioning reference signal, or
a sounding reference signal.

48. The apparatus of claim 38, wherein the waveform is associated with a multi-user multiple-input multiple-output communication.

49. The apparatus of claim 38, wherein at least one of the one or more spreading sequences or the scrambling sequence is configured to reduce a peak-to-average power ratio of the waveform.

50. The apparatus of claim 38, wherein at least one of the one or more spreading sequences or the scrambling sequence is configured to reduce a peak-to-average power ratio and inter-cell interference of the waveform.

51. The apparatus of claim 38, wherein at least one of the one or more spreading sequences or the scrambling sequence is configured to reduce inter-cell interference of the waveform.

52. The apparatus of claim 51, wherein the one or more spreading sequences are applied using a cell-specific hopping pattern.

53. The apparatus of claim 51, wherein the one or more spreading sequences are generated based at least in part on subset partitioning of a spreading codebook.

54. The apparatus of claim 51, wherein the scrambling sequence is applied using at least one of cell-specific scrambling or symbol-level scrambling.

55. The apparatus of claim 38, wherein the scrambling sequence is configured to reduce inter-cell interference of the waveform.

* * * * *